(12) United States Patent
Liu et al.

(10) Patent No.: US 8,116,735 B2
(45) Date of Patent: Feb. 14, 2012

(54) SYSTEM AND METHOD FOR MOBILE TELEPHONE ROAMING

(75) Inventors: Jing Liu, Mountain View, CA (US); Richard Xu, San Jose, CA (US); Xiaolei Qin, San Jose, CA (US)

(73) Assignee: Simo Holdings Inc., Grand Cayman (KY)

( * ) Notice: Subject to any disclaimer, the term of this patent is extended or adjusted under 35 U.S.C. 154(b) by 1022 days.

(21) Appl. No.: 12/039,646

(22) Filed: Feb. 28, 2008

(65) Prior Publication Data
US 2009/0221265 A1 Sep. 3, 2009

(51) Int. Cl.
H04W 4/00 (2009.01)
(52) U.S. Cl. ........... 455/411; 455/432.1; 455/435.1; 455/556.1; 370/328
(58) Field of Classification Search .......... 455/411, 455/432.2, 432.1, 435.1, 556.1; 370/328
See application file for complete search history.

(56) References Cited

U.S. PATENT DOCUMENTS

| | | | |
|---|---|---|---|
| 6,603,968 B2 | 8/2003 | Anvekar et al. | |
| 6,836,670 B2 | 12/2004 | Castrogiovanni et al. | 455/558 |
| 6,892,070 B2 | 5/2005 | Warrier et al. | 455/432.1 |
| 7,039,027 B2 | 5/2006 | Bridgelall | |
| 7,236,781 B2 | 6/2007 | Patil et al. | |
| 7,280,847 B2 * | 10/2007 | Goldthwaite et al. | 455/558 |
| 7,289,805 B2 * | 10/2007 | Tom et al. | 455/432.1 |
| 7,366,551 B1 * | 4/2008 | Hartley | 455/575.1 |
| 7,379,754 B2 * | 5/2008 | Sharma | 455/558 |
| 7,882,346 B2 * | 2/2011 | O'Neill et al. | 713/153 |
| 2005/0102519 A1 | 5/2005 | Morper | |
| 2006/0059393 A1 * | 3/2006 | Oppold et al. | 714/710 |
| 2006/0089140 A1 | 4/2006 | Zhang | 455/432.1 |
| 2006/0262743 A1 * | 11/2006 | Kalhan et al. | 370/328 |
| 2006/0291454 A1 * | 12/2006 | Ali | 370/352 |
| 2007/0167161 A1 | 7/2007 | Cheng et al. | 455/435.1 |
| 2009/0163175 A1 * | 6/2009 | Shi et al. | 455/411 |
| 2011/0053640 A1 * | 3/2011 | Bennett et al. | 455/556.1 |

FOREIGN PATENT DOCUMENTS

| | | |
|---|---|---|
| EP | 1 850 607 A2 | 10/2007 |
| EP | 1 625 768 B1 | 11/2007 |
| WO | WO 2004/105421 A3 | 12/2004 |

OTHER PUBLICATIONS

International Search Report and Written Opinion mailed Apr. 7, 2009 in International Application No. PCT/US2009/033628.
3rd Generation Partnership Project, 3GPP TS 43.020: "Technical Specification Group Services and System Aspects; Security related network functions.", pp. 1-96, Nov. 2000.
3rd Generation Partnership Project, 3GPP TS 51.011: "Technical Specification Group Terminals; Specification of the Subscriber Identity Module—Mobile Equipment (SIM-ME) interface Technical Specification Group Terminals." pp. 1-172, Jun. 2005.
3rd Generation Partnership Project, 3GPP TS 51.014: "Specification of the SIM Application Toolkit for the Subscriber Identity Module—Mobile Equipment (SIM-ME) interface.", pp. 1-85, Dec. 2004.
U.S. Appl. No. 60/891,894, filed Feb. 27, 2007, Liu.

* cited by examiner

*Primary Examiner* — Lester Kincaid
*Assistant Examiner* — Steven Kelley
(74) *Attorney, Agent, or Firm* — K&L Gates LLP

(57) ABSTRACT

A foreign wireless communication system is operated in a local communication network as if the foreign wireless communication system were a local wireless communication system. A data communication link is established between the wireless communication system and a service provider in a local wireless communication network. An outgoing request for authentication information is communicated from the wireless communication system to a remote administration system over the data communication link. The authentication information is received over the data communication link from the administration system and is transmitted over a signal link from the wireless communication system to the service provider. A requested wireless communication service is received at the wireless communication system based on authentication of the wireless communication system by the service provider using the authentication information.

16 Claims, 15 Drawing Sheets

| Non-Local Calls Database 525 | | |
|---|---|---|
| Location 1 | Area Code 1 | Access Number 1 |
| | | |
| Location n | Area Code n | Access Number n |

Figure 5B

SYSTEM AND METHOD FOR MOBILE TELEPHONE ROAMING

TECHNICAL FIELD

The disclosed embodiments relate generally to mobile telecommunication systems, and in particular to a system and method for operating a foreign mobile telecommunications device in a local communication network as if it were a local mobile telecommunications device.

BACKGROUND

Historically, consumer telephones and computing devices were tethered to telecommunications networks via one or more communication cables. Within the past few decades, the reduced cost and size of electronics devices, improved and standardized communications technologies, and capital investments in communications infrastructure have enabled the widespread use of mobile voice and data communications devices that operate wirelessly using radio signals. The use of mobile telecommunications has grown so rapidly that wireless communications devices, such as cellular telephones, wireless personal digital assistants (PDA), and wireless laptop computers, are ubiquitous in today's industrialized countries. To communicate, these devices transmit and/or receive audio, video, and/or data over wireless communications networks, like cellular, satellite, or WIFI networks.

The wireless communications service providers that operate these wireless communications networks provide subscribed services to the users of the wireless communications devices by providing for registration, authentication, location updating, handovers, call routing, etc.

The most widespread wireless communication network in use today is that of cellular telephones. However, not all cellular telephone networks communicate using the same standards. The most popular standard is the Global System for Mobile communications (GSM), which is implemented by communications service providers in over 200 countries and territories. This allows GSM subscribers to use their cellular telephones and other GSM data communications devices in many parts of the world. GSM specifies standards for voice communications and also for Short Message Service (SMS) text messaging, General Packet Radio Service (GPRS) packet data communications, and Enhanced Data Rates for GSM Evolution (EDGE) higher-speed data communications.

GSM provides subscriber verification and authentication, and encrypts communications between subscribers and the remainder of the telecommunications network. A Subscriber Identity Module (SIM), a detachable electronics card, stores the subscriber's International Mobile Subscriber Identity (IMSI), individual subscriber authentication key (Ki), ciphering key (Kc), and personal information such has the subscriber's phonebook. The IMSI is composed of a Mobile Country Code (MCC), a Mobile Network Code (MNC) and a subscriber-specific Mobile Subscriber Identity Number (MSIN).

The portability of SIM cards allows subscribers to easily swap SIM cards between GSM compatible devices and continue to use the communications network using the subscriber account associated with their SIM card.

A key GSM feature is roaming, the ability for a mobile customer to automatically make and receive voice calls, send and receive data, or access other services, including data services, when traveling outside the geographical coverage area of the home network. Roaming is supported by mobility management, authentication, authorization and billing procedures agreed upon by the various service providers. A subscriber's home network is the one where the mobile communications device is registered in the Home Location Register (HLR). When a mobile communications device is powered on or transferred to a network, using the IMSI, the network determines whether the station is registered in its HLR. If it is, the network is the subscriber's home network and communications proceed. If the mobile communications device is not registered, the visited network attempts to identify the device's home network, and then requests service information about the mobile communications device. If there is no roaming agreement between the two service providers, or if the mobile communications device is not allowed to roam, the visited network denies service. If service is allowed, the visited network establishes a Temporary Mobile Subscriber Identity (TMSI) and begins to maintain a service record. The home network updates its information to indicate that the mobile communications device is on the visited network, its new host network, so any information sent to it can be routed correctly. When a call is made to a roaming mobile communications device, the Public Switched Telephone Network (PSTN) routes the call to the station's home network, which then routes it to the visited network.

Although roaming provides necessary capabilities, it works only when the home and visited network use the same communications technologies and have a roaming agreement. Also, roaming fees, especially international fees, can be costly. Furthermore, from the subscriber's viewpoint roaming fees can appear unjustified, for example, when one member of a group of business travelers or tourists from the same home network calls another in the same visited network. To circumvent such difficulties, some subscribers purchase, rent or borrow SIM cards or mobile communications devices with SIM cards, for the visited or foreign network. For example, a traveler from the U.S. to the U.K. might rent or buy a SIM card or cellular telephone from a vendor in London. Purchasing and swapping-out SIM cards is inconvenient, inefficient, and technically challenging for most subscribers, especially when traveling to multiple foreign countries. This approach also does not support incoming calls to the subscriber's regular cellular phone number. Moreover, most subscribers purchase prepaid SIM cards for a set amount and may either run out of prepaid communication time on the card or pay for communication time that they do not end up using.

As such, a system and method that allows users to easily travel between networks without being charged excessive roaming charges would be highly desirable.

Furthermore, in the case of wireless data services, like WIFI or WIMAX, users may connect to remote wireless access points or "hotspots" by paying a monthly or hourly fee. Monthly fees typically cost less per hour than the hourly fee system, but users may not fully utilize the network for the entire period. As such, a system and method that allows users to easily roam between networks, not be charged excessive charges, and simplify all charges into a single invoice would be highly desirable.

SUMMARY

The described embodiments apply to mobile and wireless communication devices, including cellular telephones, smart-phones, laptop computers, palmtop computers, Ultra-Mobile Personal Computers (UMPC), PDA, dual-mode (tele- and data-communications) phones, and other devices capable of voice and/or data communications like text messaging, Internet browsing, etc, such as a Blackberry® handheld device or portable computer. Embodiments of the present invention makes wireless communication clients more convenient and less expensive to operate in a multitude of geographic locations, such as in different countries, different regions within a large country, or where different communications technologies are required, such as CDMA and GSM.

A user of a wireless mobile device subscribes to the service described in the embodiments below. The service owns or rents from local mobile service operators, local subscriptions and corresponding authentication data for a plurality of communications networks, and maintains a database of subscribers and their current locations. When a subscriber travels to a location in which the subscriber's mobile wireless communications device is not otherwise considered local (i.e., a foreign location), the mobile wireless communications device communicates with an authentication server (described below in relation to FIG. 1), which downloads the parameters required to enable the device to operate as a virtual local mobile device. As a result, the mobile device's local communications in the foreign location are indistinguishable from those of any other mobile device for which the location is local.

International and other non-local communications are transferred to or from a Communications Server (also described below in relation to FIG. 1) such that all outgoing calls are local to the communications network at the subscriber's current location. Thus, the subscriber has all the conveniences of local communications network subscribers, and does not incur any roaming or other foreign-user communications charges, other than those charged by the service operator.

BRIEF DESCRIPTION OF THE DRAWINGS

Like reference numerals refer to corresponding parts throughout the drawings.

DESCRIPTION OF EMBODIMENTS

The methods and systems described below allow a foreign wireless communication device to operate in a local wireless communication network as if it were a local wireless communication client. For example, a cellular telephone associated with a wireless contract with AT&T® in San Francisco (the foreign wireless communication client) makes a telephone call from a VODAPHONE® cellular telephone network in London (the local wireless communication network). Normally, AT&T® will charge the user of the cellular telephone high roaming charges for calls made while in London. However, the system and method described below enables the AT&T® cellular telephone to operate in London as if it were a cellular telephone associated with a contract with VODAPHONE® in London. This ability to operate a foreign wireless communication client in a local wireless communication network as if it were a local wireless communication client provides significant cost savings to the user, who is no longer subject to the excessive roaming charges demanded by the user's cellular phone provider.

Figure 1:
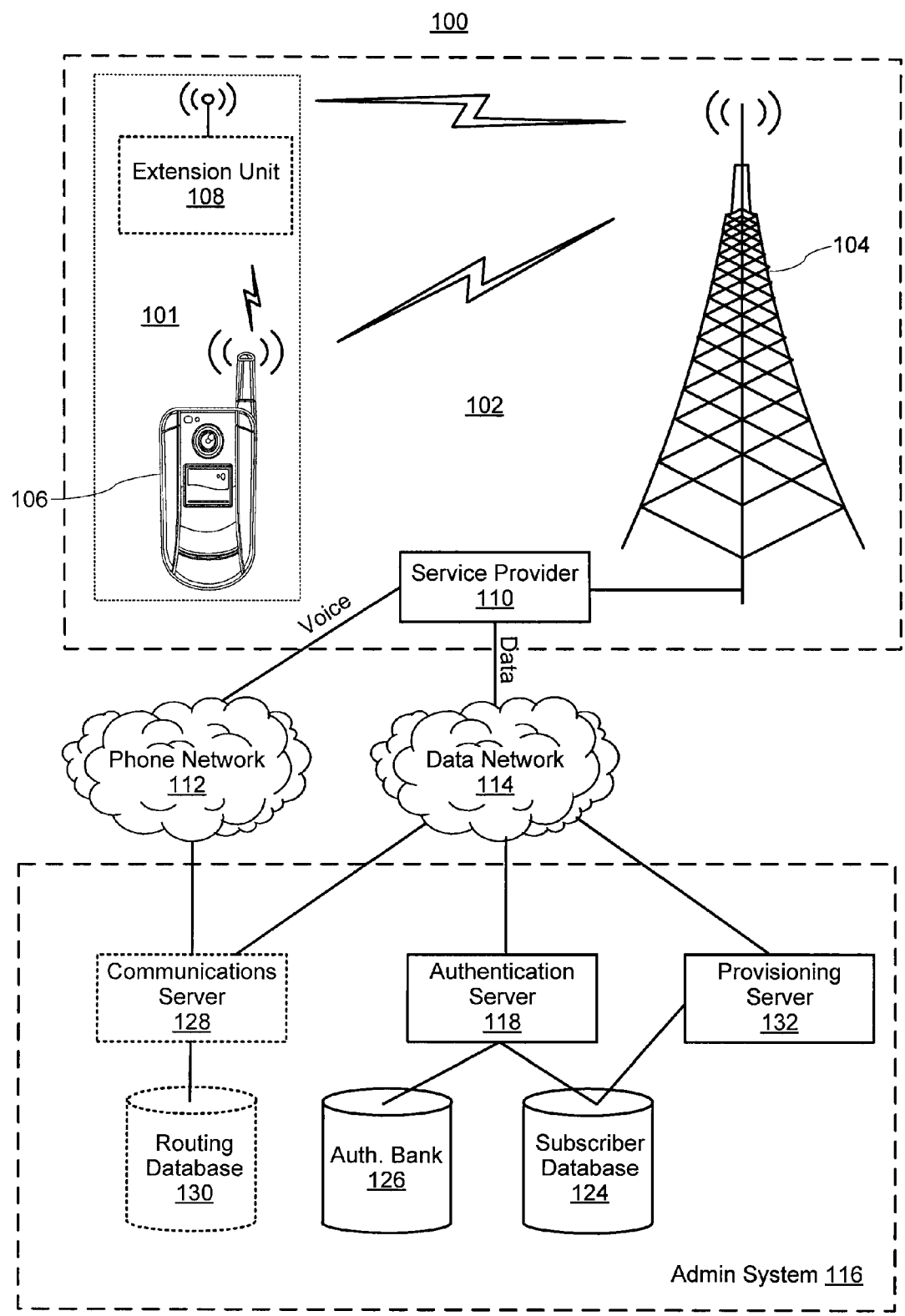
FIG. 1 is a block diagram of an embodiment of a system for operating a foreign wireless telecommunications device in a local communication network as if it were a local wireless telecommunications device.

FIG. 1 shows a communications system 100 that includes a wireless communication network 102 coupled to a voice network 112, such as a public switched telephone network (PSTN), and a data network 114. The communications system 100 also includes an administration system 116 coupled to the voice network 112 and data network 114. The wireless communications network 102 may be used to communicate voice and/or data and includes cellular telephone, WIFI, or WIMAX networks. In the case of a cellular telephone network, the network 102 includes a number of cellular sites or base stations 104, which typically consist of an antenna tower, transceiver radios (i.e., base transceiver station), and radio controllers (i.e., base station controller). In the case of data networks, such as WIFI or WIMAX, the network 102 includes a number of base stations 104, which typically include access points, wireless routers, or the like. Base stations 104 include a transceiver, or a transmitter and receiver, through which radio links are established between the network 102 and a number of wireless communication clients, including the wireless communication client 106. The wireless communication client 106 may be any telephone or computing device capable of communicating wirelessly, such as a cellular telephone handset, personal digital assistant (PDA), computer, VOIP gateway, SIP phone, or the like. In some embodiments, the wireless communication client 106 must be capable of accessing and communicating data. The wireless communication client 106 is discussed in detail below with reference to FIG. 5A.

Also shown in FIG. 1 is an optional wireless communication extension unit 108. In these embodiments, the extension unit 108 is capable of communicating with both the wireless communication client 106 and the wireless communication network 102, including base station 104. The wireless communication extension unit 108 is discussed in detail below with reference to FIGS. 5B and FIG. 9. Also, as used herein the combination of the wireless communication client 106 and/or the extension unit 108 is referred to as the wireless communication system 101.

The provider 110 of the wireless network 102 is coupled to the one or more base stations 104. This service provider 110 is also coupled to the voice network 112 and the data network 114.

For convenience, the remainder of the description will refer to the embodiment where the wireless network 102 is a cellular telephone network, such as a GSM, GPRS (General Packet Radio Service), CDMA (Code Division Multiple Access), EDGE Enhanced Data for GSM Evolution, 3GSM, DECT, IS-136, and iDEN, analog, and any combination of these, and the like. However, it should be appreciated that the same system can be used for providing any other type of wireless voice or data service, such as WIMAX, WiFI, VOIP, etc.

The service provider 110 may include a number of mobile telephone switching centers ("MSC"), located at one or more mobile telephone switching offices ("MTSO") which route the transmissions. Additionally, the service provider 110 may include one or more base cellular centers ("BSC"), not shown, coupled between base stations 104 and the MSCs 20, for example, to handle call hand off.

The service provider 110 constantly monitors the signal strength of both the caller and receiver, locating the next cell site when signal strength fades, and automatically rerouting the communications to maintain the communications link. For example, when the wireless communication client 106 moves from one cell to another cell, the service provider 110 monitors the movement, and transfers or hands-off the telephone call from a first base station to a new base station at the appropriate time. The transfer may include switching the radio frequency of the communication, and is transparent to the user. Thus, the service provider 110 acts like a standard PSTN or ISDN switching node, and additionally provides mobile subscriber related functions such as registration, authentication, location updating, handovers and call routing to roaming subscribers.

The service provider 110 typically employs one or more databases (e.g., Home Location Register "HLR" and a Visitor Location Register "VLR") for tracking subscribers, routing calls and roaming. The service provider 110 also typically employs a database (e.g., Authentication Center "AuC") for authenticating subscribers, and a separate database (e.g., Equipment Identity Register "EIR") for verifying the equipment. The service provider 110 allocates a routing number to each of the calls that the service provider 110 is switching. While the routing number is different than the unique subscriber identifier (e.g., IMSI) and the unique equipment identifier (e.g., International Mobile Equipment Identity "IMEI"), the MTSO may define a relationship between the routing number and the subscriber and/or equipment identifiers associated with each wireless communication client 106. These identifiers allow the service provider 110 to track and coordinate all wireless communication clients 106 in its service area, and also allow the service provider 110 to determine the validity of the call and caller.

As is well understood and documented in the art, the service provider 110 routes voice communications to other callers on its network, through its network of base stations 104, or to the PSTN network 112. Data communications are routed to the data network 114, which is typically the Internet.

The data network 114 is coupled to the administration system 116. The administration system 116 provisions the foreign wireless communication client 106 to operate in a local wireless communication network 102 as if it were a local wireless communication client. By "foreign" it is meant that the wireless communication client 106 (or its SIM card) is not subscribed to the wireless communications network 102. For example, a cellular telephone associated with a wireless contract with AT&T® in San Francisco (the foreign wireless communication client) is not subscribed to the VODAPHONE® cellular telephone network in London (the local wireless communication network). Here, the administration system 116 enables the AT&T® cellular telephone to operate in London as if it were a cellular telephone associated with a contract with VODAPHONE® in London.

The administration system 116 includes at least one authentication server 118 coupled to a subscriber database 124 and an authentication bank 126, as well as at least one optional communications server 128 coupled to a routing database 130. The authentication server 118 primarily authenticates incoming requests for authentication and maintains subscriber accounts. The authentication server 118 is described further in reference to FIG. 2A. The communications server 128 facilitates the rerouting of non-local calls to further provide reduced cost routing. The communications server 128 is described in detail below with reference to FIG. 4A. The routing database 130 is described in detail below with reference to FIG. 4B. The administration system 116 includes at least one provisioning server 132, which provides requesting subscribers with remote authentication software. The provisioning server 132 is described further in reference to FIG. 2B. The provisioning server 132 and/or authentication server 118 and/or communications server 128 may be implemented as one or more components local to regional networks, at a central location, at enterprise computing/communications centers, or in consumer products.

The one or more authentication banks 126 and/or the one or more subscriber databases 124 may be commonly housed or housed separately from the one or more associated authentication servers 118, communication servers 128, and routing databases 130. An authentication bank 126 is discussed in detail below with reference to FIG. 3A. The subscriber database 124 is discussed in detail below with reference to FIG. 3B. Some embodiments of the administration system 116 may include additional components for redundancy and faster access time.

Figure 2A:
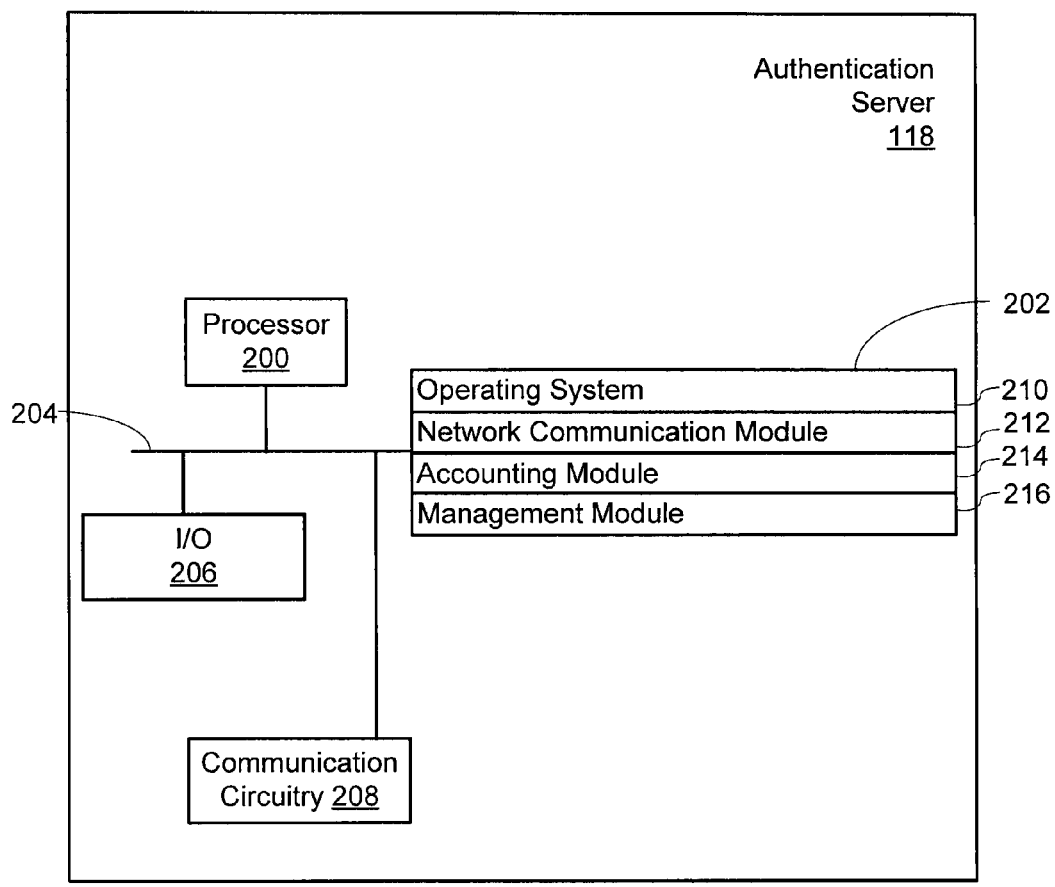
FIG. 2A is a block diagram of an embodiment of the authentication server shown in FIG. 1.

FIG. 2A illustrates an embodiment of the authentication server 118. The authentication server 118 contains a plurality of components, such as at least one central processor 200; a memory 202; communications circuitry 208; input and/or output devices 206, like a monitor, keyboard and mouse; and at least one bus 204 that connects the aforementioned components. The memory 202 may comprise Random Access Memory (RAM), Read Only Memory (ROM), or the like. The processor 200 may be any logic processing unit, such as one or more central processing units (CPUs), digital signal processors (DSPs), application-specific integrated circuits (ASICs), etc. Different embodiments may include some or all of these components. Also in some embodiments, these components are at least partially housed within a housing.

In some embodiments the authentication server 118 includes a hard disk drive (not shown) for reading from and writing to a hard disk, and/or an optical disk drive (not shown) and/or a magnetic disk drive (not shown) for reading from and writing to removable optical disks (not shown) and magnetic disks (not shown), respectively. The optical disk can be read by a CD-ROM, while the magnetic disk can be a magnetic floppy disk or diskette. The hard disk drive, optical disk drive, and magnetic disk drive may communicate with the processing unit via the bus 204. The hard disk drive, optical disk drive and magnetic disk drive may include interfaces or controllers (not shown) coupled between such drives and the bus 204, as is known by those skilled in the relevant art. The drives and their associated computer-readable media, provide non-volatile storage of computer readable instructions, data structures, program modules and other data for the authentication server 118. Other types of computer-readable media that can store data accessible by a computer may be employed, such a magnetic cassettes, flash memory cards, digital video disks (DVD), Bernoulli cartridges, RAMs, ROMs, smart cards, etc.

The bus 204 can employ any known bus structures or architectures, including a memory bus with memory controller, a peripheral bus, and a local bus. Unless described otherwise, the construction and operation of the various blocks shown in FIG. 2A are of conventional design. As a result, such blocks need not be described in further detail herein, as they are well understood by those skilled in the relevant art.

The communications circuitry 208 is used for communicating with the data network 114, service provider 110, wireless communication client 106, and/or extension unit 108.

The memory 202 may include one or more application programs, modules, and/or data, including an operating system 210 which has instructions for communicating, processing, accessing, storing, or searching data. Examples of suitable operating systems include DOS, UNIX, WINDOWS, or LINUX. The operating system may also include a basic input/output system (BIOS), which may form part of the ROM, may contain basic routines to help transfer information between elements within the authentication server 118, such as during startup. In addition, the memory 202 may also include a network communication module 212 for communicating with the data network 114, service provider 110, wireless communication client 106, and/or extension unit 108; an accounting module 214, and a management module 216. Different embodiments may include some or all of these procedures or modules in memory.

In some embodiments, the network communication module 212 receives requests from wireless communication clients 106 and/or wireless communication client extension units 108 for authentication information and passes the request to the management module 216. In some embodiments, after verifying the requestor based on subscriber information stored in subscriber database 124 and/or after updating the subscriber information stored in subscriber database 124, the management module 216 locates and provides local wireless network authentication information from the authentication bank 126 to the requesting wireless communication client 106 or extension unit 108. Further details of the method for authenticating a client 106 are provided below with reference to FIGS. 7 and 8.

The accounting module 214 manages various subscriber accounts, including maintaining: a list of active subscriber accounts in the subscriber database 124; tracking and calculating subscriber usage; allocating costs for wireless account usage; and/or generating billing data. In some embodiments, the accounting and management modules continually update records in the subscriber database 124 indicating when and how long a particular local wireless account (e.g., an account with VODAPHONE®) was used by a particular subscriber using a particular wireless communication client 106.

Figure 2B:
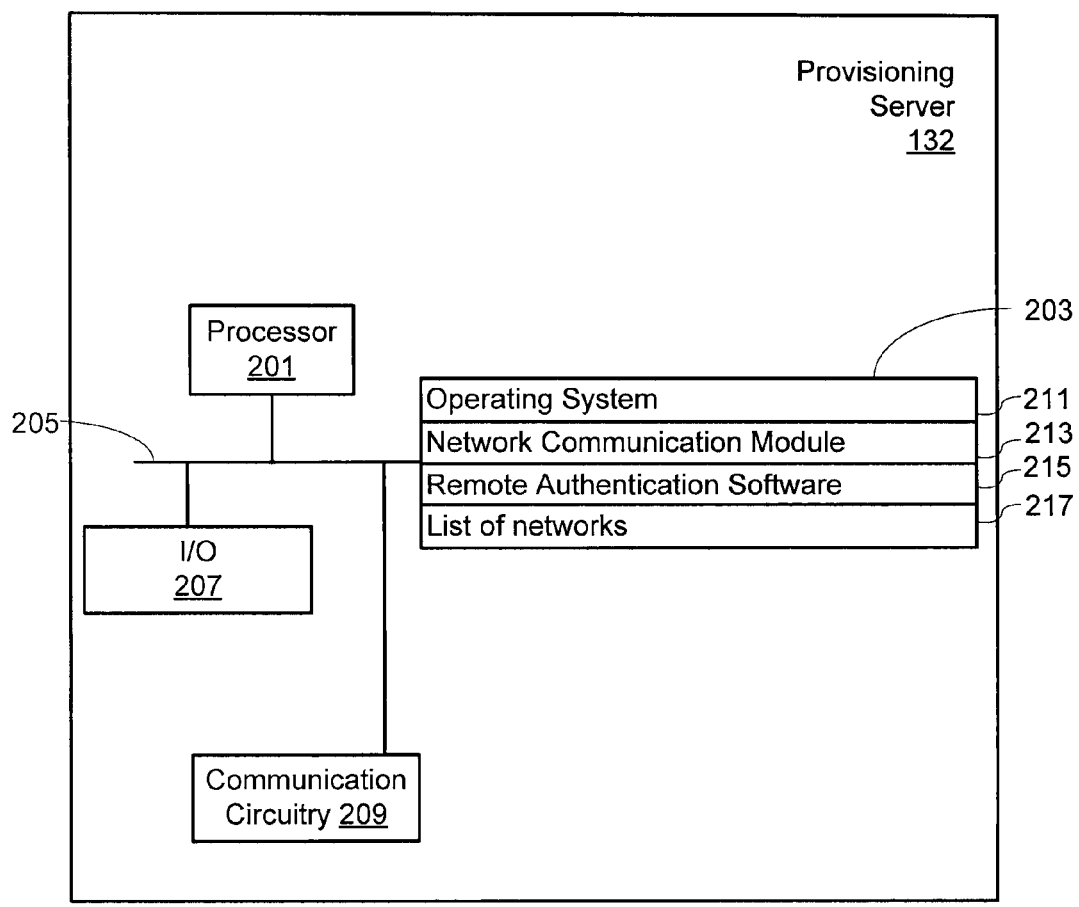
FIG. 2B is a block diagram of an embodiment of the provisioning server shown in FIG. 1.

FIG. 2B illustrates an embodiment of the provisioning server 132 of FIG. 1. The provisioning server 132 contains a plurality of components, such as at least one central processor 201; a memory 203; communications circuitry 209; input and/or output devices 207, like a monitor, keyboard and mouse; and at least one bus 205 that connects the aforementioned components. The memory 203 may comprise Random Access Memory (RAM), Read Only Memory (ROM), or the like. The processor 201 may be any logic processing unit, such as one or more central processing units (CPUs), digital signal processors (DSPs), application-specific integrated circuits (ASICs), etc. Different embodiments may include some or all of these components. Also in some embodiments, these components are at least partially housed within a housing.

In some embodiments the provisioning server 132 includes a hard disk drive (not shown) for reading from and writing to a hard disk, and/or an optical disk drive (not shown) and/or a magnetic disk drive (not shown) for reading from and writing to removable optical disks (not shown) and magnetic disks (not shown), respectively. The optical disk can be read by a CD-ROM, while the magnetic disk can be a magnetic floppy disk or diskette. The hard disk drive, optical disk drive, and magnetic disk drive may communicate with the processing unit via the bus 205. The hard disk drive, optical disk drive and magnetic disk drive may include interfaces or controllers (not shown) coupled between such drives and the bus 205, as is known by those skilled in the relevant art. The drives and their associated computer-readable media, provide non-volatile storage of computer readable instructions, data structures, program modules and other data for the authentication server 118. Other types of computer-readable media that can store data accessible by a computer may be employed, such a magnetic cassettes, flash memory cards, digital video disks (DVD), Bernoulli cartridges, RAMs, ROMs, smart cards, etc.

The bus 205 can employ any known bus structures or architectures, including a memory bus with memory controller, a peripheral bus, and a local bus. Unless described otherwise, the construction and operation of the various blocks shown in FIG. 2B are of conventional design. As a result, such blocks need not be described in further detail herein, as they are well understood by those skilled in the relevant art.

The communications circuitry 209 is used for communicating with the data network 114, service provider 110, wireless communication client 106, and/or extension unit 108.

The memory 203 may include one or more application programs, modules, and/or data, including an operating system 211 which has instructions for communicating, processing, accessing, storing, or searching data. Examples of suitable operating systems include DOS, UNIX, WINDOWS, or LINUX. The operating system may also include a basic input/output system (BIOS), which may form part of the ROM, may contain basic routines to help transfer information between elements within the authentication server 118, such as during startup. In addition, the memory 203 may also include a network communication module 213 for communicating with the data network 114, service provider 110, wireless communication client 106, and/or extension unit 108; remote authentication software 215 (e.g., a list of area codes and corresponding locations; a list of local dial-in telephone numbers for use when the subscriber wants to make a non-local call; etc); and a list of networks 217. Different embodiments may include some or all of these procedures or modules in memory.

In some embodiments, the network communication module 213 receives requests from wireless communication clients 106 and/or wireless communication client extension units 108 for remote authentication software 215. In some embodiments, the memory 203 stores multiple versions of remote authentication software 215 corresponding to different communication networks (e.g., GSM, CDMA, and so on) and different mobile operating systems, such as PALM OS or BLACKBERRY OS. The operating system 211 contains instructions to determine what type of wireless/mobile network (e.g., GSM, CDMA, and so on) and mobile operating system is being used by the requesting wireless communication system 101, for instance, by using list of networks 217 and provide the requesting wireless communication system 101 with an appropriate version of the remote authentication software 215. Further details of the method for a wireless communication system 101 enrolling in remote authentication service is provided below with reference to FIG. 6.

Figure 3A:
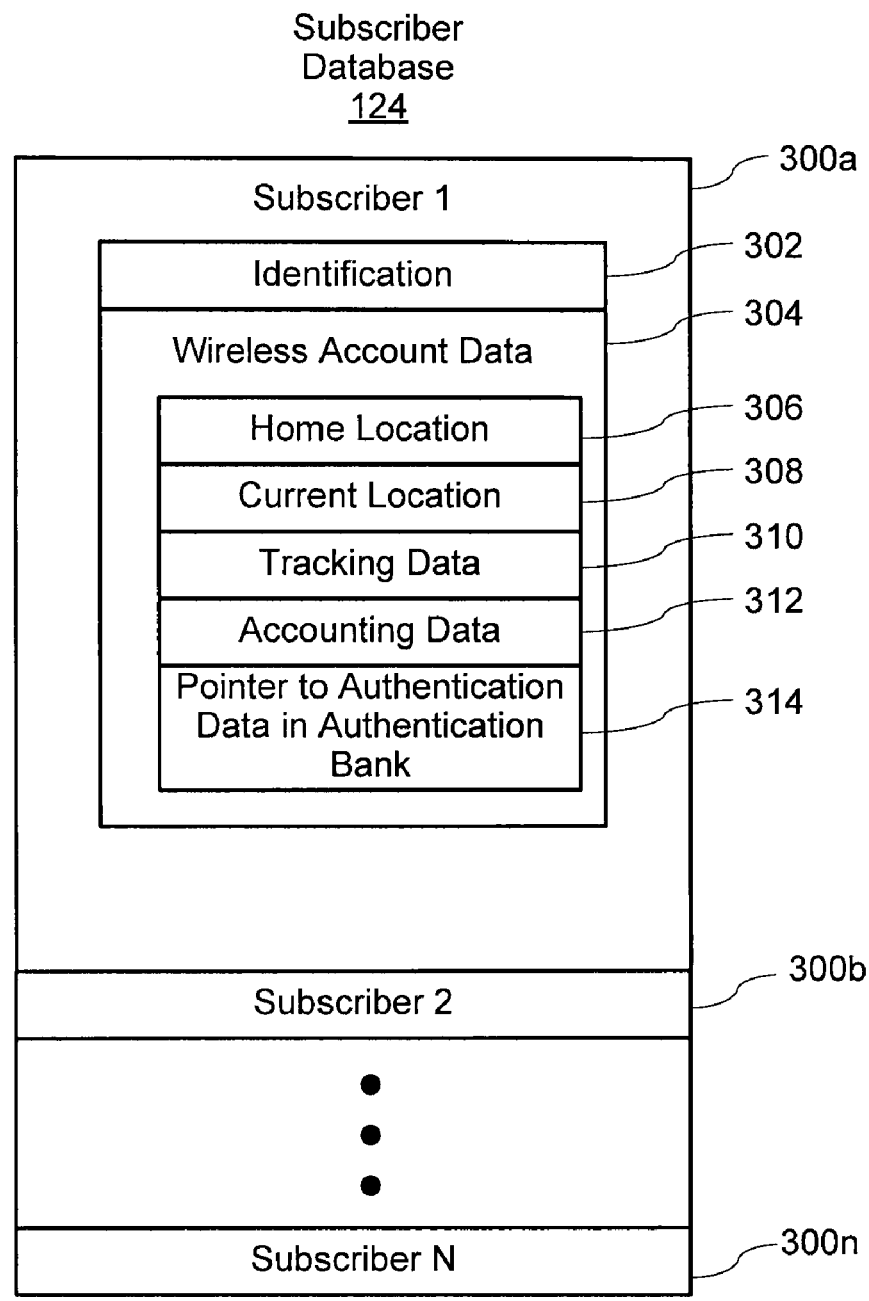
FIG. 3A is a block diagram of an embodiment of the subscriber database shown in FIG. 1.

FIG. 3A is a block diagram of an embodiment of the subscriber database 124 shown in FIG. 1. The subscriber database 124 includes data for one or more users or subscribers 300a-300n of the system. For each subscriber, the subscriber database 124 stores identification data 302, such as the subscriber's contact details, billing address, a unique identifier of the subscriber's wireless communication device 106, SIM card, or extension unit 108. The identification data may include personal demographic information (e.g., name, address, telephone number, email address), financial information (e.g., credit card information), user web portal login information (e.g., username and password), etc.

For each subscriber, the subscriber database 124 may also store the home location 306 where the user or subscriber has his/her account; the current location 308 of the wireless communication device 106, SIM card, and/or extension unit 108 of the subscriber; subscriber tracking data 310; accounting data 312 for the subscriber; and/or a pointer to the authentication data currently being used by the subscriber and stored in the authentication bank 126 (FIG. 1). The home location 306 is the geographic location where the subscriber has their wireless account, such as San Francisco for the subscriber's AT&T® cellular telephone account. The home location data may also include the wireless communication client data for the subscriber's home location (home public lands mobile network (HPLMN) and telephone number), and wireless communication client data for the subscriber's current location (registered public lands mobile network (RPLMN)). Similarly, the current location 308 is the location where the subscriber's wireless communication device 106, SIM card, and/or extension unit 108 is, as determined by the system (described in detail below). For example, the current location is London, England. The tracking data 310 are data collected about the user's connectivity sessions, times, locations, etc. The accounting data 312 is a calculation of the user's communication session times, costs per minute per location, running and total costs, etc. Invoices may be generated from the accounting data 312. Finally, the wireless account data 304 may include a pointer to the authentication data in the authentication bank that the subscriber is currently using or has historically used. For example, while in London, the user may be authenticating service from a particular VODAPHONE® SIM card in the authentication bank 126 (FIG. 1), which has an associated account profile stored in the accounting module 214 (FIG. 2A) that has a particular profile of cost per minute for different times of the day. It should be noted that the pointer 314 does not need to remain associated with particular authentication data and can change for each wireless communication session. For example, the subscriber may use a particular VODAPHONE® SIM card (and associated account) when making a call during the day in London, and an ORANGE® SIM card when making a call in the evening in London. The accounting module 214 automatically determines the most cost effective account (and associated SIM card) to use at any particular time and location. This process is transparent to the user.

Figure 3B:
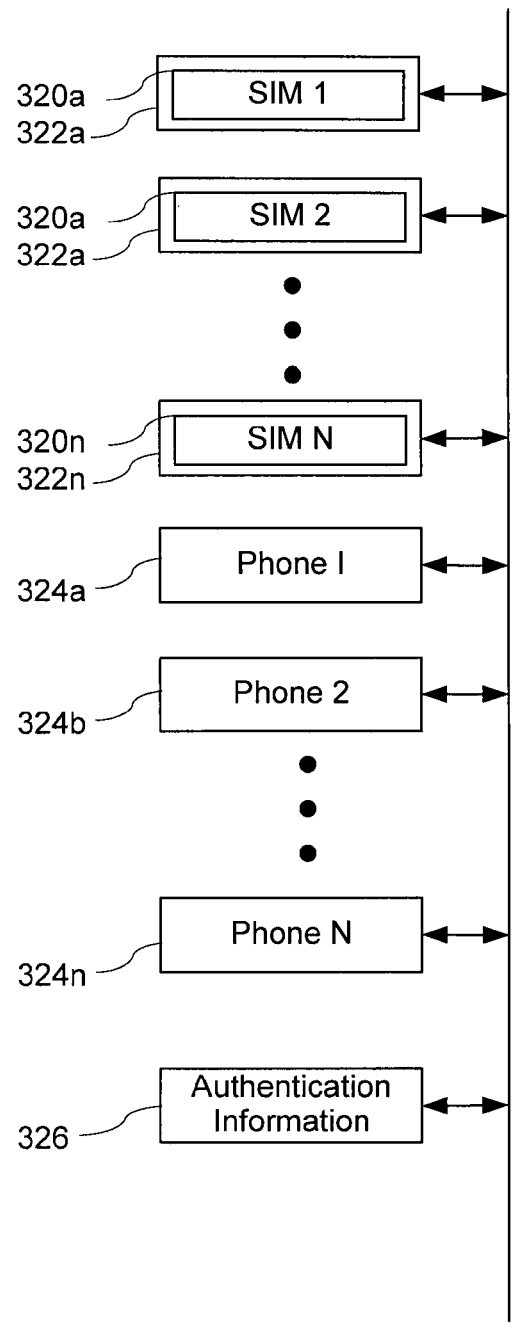
FIG. 3B is a block diagram of an embodiment of the authentication bank shown in FIG. 1.

FIG. 3B is a block diagram of the authentication bank 126 shown in FIG. 1. The authentication bank 126 contains one or more: physical identification modules (e.g., SIM cards) 320a-320n; phones 324a-324n; and/or other authentication information 326. In use, the management module 214 (FIG. 2A) and the accounting module 216 (FIG. 1) of the authentication server 118 (FIGS. 1 and 2) access the authentication bank 126 to obtain authentication information for the current location of a particular wireless communication client 106 and/or extension unit 108 (FIG. 1). As explained in detail below, the stored physical identification modules 320 are used for provisioning wireless communication for the wireless communication clients 106 and/or extension units 108 (FIG. 1) in locations that have GSM networks, such as the U.K. A stored physical identification module 320 may include one or more of Subscriber Identity Module (SIM) cards, a Universal Subscriber Identity Module (USIM) cards, a Removable User Identity Module (RUIM) cards, a Willcom-SIM, a Universal SIM, etc. In the description herein, the term SIM is used to refer to any such physical identification module.

Most wireless communications devices include secure authentication data within the device. In Global System for Mobile (GSM) communication systems, a removable smart card Integrated Circuit Card (ICC), also known as a subscriber identity module ("SIM") card, securely stores subscriber related data or information, such as a service-subscriber key (IMSI) used to identify a subscriber. The SIM card allows users to change phones by simply removing the SIM card from one cellular or mobile phone and inserting it into another cellular phone or broadband telephony device. The SIM card may also store one or more identifiers that uniquely identify a subscriber account. In other communication systems, such as the Universal Mobile Telecommunications System (UMTS), the equivalent of a SIM card is called the Universal Subscriber Identity Module (USIM). Similarly, in networks that use Code division multiple access (CDMA), the Removable User Identity Module (RUIM) is more popular. However, many CDMA-based networks do not require any such card, and the service is bound to a unique identifier contained in the wireless device itself.

SIM cards store network specific information used to authenticate and identify subscribers on the network, the most important of these are the ICCID, IMSI, Authentication Key (Ki), Local Area Identity (LAI) and Operator-Specific Emergency Number. The SIM also stores other carrier specific data such as the SMSC (Short Message Service Center) number, Service Provider Name (SPN), Service Dialing Numbers (SDN), Advice-Of-Charge parameters and Value Added Service (VAS) applications.

In networks using SIM cards, when the wireless communications device is turned on, it obtains the IMSI from the SIM card, and passes this to the network operator (such as service provider 110) requesting access and authentication. The network operator searches its database for the incoming IMSI and its associated Ki. The network operator then generates a Random Number (RAND) and signs it with the Ki associated with the IMSI (and stored on the SIM card), computing another number known as Signed Response (SRES_1). The network operator then sends the RAND to the wireless communications device, which passes it to the SIM card. The SIM card signs it with its Ki, producing SRES_2 which it gives to the wireless communications device along with encryption key Kc. The Mobile wireless communications device passes SRES_2 on to the network operator. The operator network then compares its computed SRES_1 with the computed SRES_2 that the wireless communications device returned. If the two numbers match the SIM is authenticated and the wireless communications device is granted access to the network. Kc is used to encrypt all further communications between the wireless communications device and the network. The network may periodically require re-authentication of the wireless communications device.

Also, as explained in detail below, the phones 324 are used for provisioning wireless communication for the wireless communication clients 106 and/or extension units 108 (FIG. 1) in locations that store authentication data directly on the phone and not on a SIM card, such as is common with CDMA carriers like SPRINT®. The authentication information 326 is used for provisioning other wireless communication, such as for WIFI hotspot authentication or the like.

Each of the SIM cards 320a-n may be received in a physical slot 322a-n, which is sized and dimensioned for receiving SIM cards. Each slot, may for example, take the form of a number of electrical contacts or optical transceivers aligned to couple with a complementary interface on the SIM card. A universal asynchronous receiver/transceiver (UART) (not shown) is associated with each of the SIM slots 322. The UART is a device, usually in the form of an integrated circuit, which performs the parallel-to-serial conversion of digital data that has been transmitted, for example, from a modem or other serial port, for use by a computer, and which converts parallel to serial, for example, suitable for asynchronous transmission over phone lines.

It should be appreciated that although SIM cards are described herein, any comparable readable media may that stores unique subscriber identifying information, such as an IMSI and/or secret key, may be used. For example, such readable media may include Universal Subscriber Identity Module, a Removable User Identity Module, a Willcom-SIM, and a Universal SIM.

In some embodiments, a phone 324a and/or SIM 320a and/or authentication information 326 has associated with it a corresponding unique phone number. Accordingly, when phone 324a and/or SIM 320a and/or authentication information 326 is assigned to a particular wireless communication client 101, the unique phone number is assigned to the wireless communication client 101 as well. In some embodiments, the assignation information is stored in subscriber database 124 and/or routing database 130.

Figure 4A:
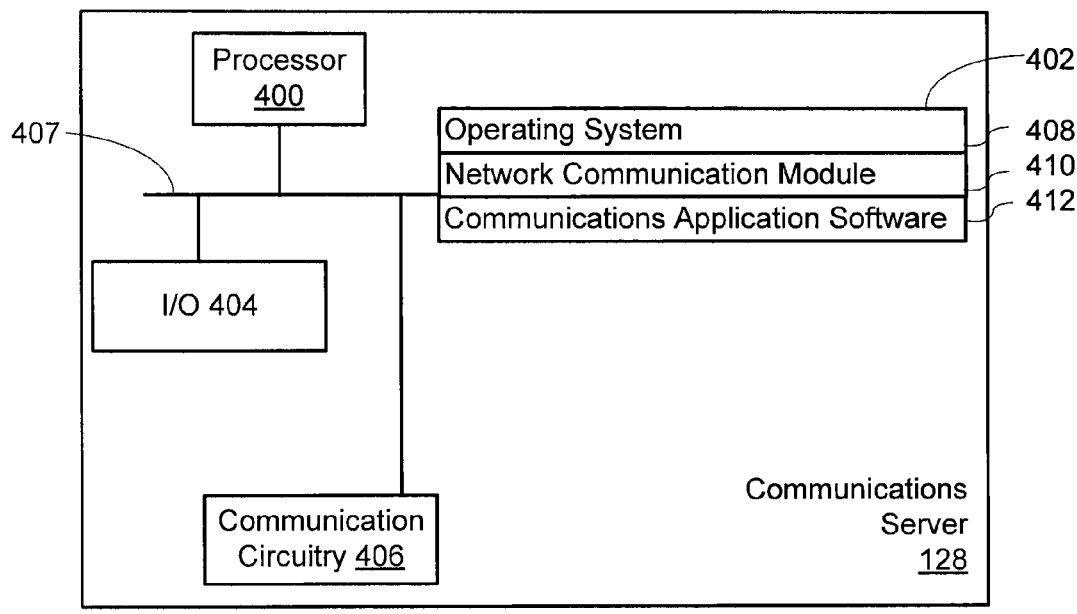
FIG. 4A is a block diagram of an embodiment of the communications server shown in FIG. 1.

FIG. 4A is a block diagram of an embodiment of the communications server 128 shown in FIG. 1. The communications server 128 contains a plurality of components, such as at least one processor 400; a memory 402; communications circuitry 406; input and/or output devices 404, like a display, keyboard, and mouse; and at least one bus 407 that connects the aforementioned components. Different embodiments may include some or all of these components. Also in some embodiments, these components are at least partially housed within a housing. The processor 400 may be any logic processing unit, such as one or more central processing units (CPUs), digital signal processors (DSPs), application-specific integrated circuits (ASICs), etc.

The communications circuitry 406 is used for communicating with the data and voice networks 114 and 112 respectively (FIG. 1). In some embodiments the communications server 128 includes a hard disk drive (not shown) for reading from and writing to a hard disk, and/or an optical disk drive (not shown) and/or a magnetic disk drive (not shown) for reading from and writing to removable optical disks (not shown) and magnetic disks (not shown), respectively. The optical disk can be read by a CD-ROM, while the magnetic disk can be a magnetic floppy disk or diskette. The hard disk drive, optical disk drive, and magnetic disk drive may communicate with the processing unit via the bus 407. The hard disk drive, optical disk drive and magnetic disk drive may include interfaces or controllers (not shown) coupled between such drives and the bus 407, as is known by those skilled in the relevant art. The drives and their associated computer-readable media, provide non-volatile storage of computer readable instructions, data structures, program modules and other data for the communications server 128. Other types of computer-readable media that can store data accessible by a computer may be employed, such a magnetic cassettes, flash memory cards, digital video disks (DVD), Bernoulli cartridges, RAMs, ROMs, smart cards, etc.

The bus 407 can employ any known bus structures or architectures, including a memory bus with memory controller, a peripheral bus, and a local bus. Unless described otherwise, the construction and operation of the various blocks shown in FIG. 4A are of conventional design. As a result, such blocks need not be described in further detail herein, as they are well understood by those skilled in the relevant art.

The memory 402 may comprise Random Access Memory (RAM), Read Only Memory (ROM), or the like. The memory 402 may include one or more application programs, modules, and/or data, including an operating system 408 which has instructions for communicating, processing, accessing, storing, or searching data. Examples of suitable operating systems include LINUX, JAVA, WINDOWS MOBILE, PALM OS, or the like. The operating system may also include a basic input/output system (BIOS), which may form part of the ROM, may contain basic routines to help transfer information between elements within the communications server 128, such as during startup. In addition, the memory 402 may also include a network communication module 410 for communicating with the data network 114, voice network 112 (FIG. 1), and routing database 130 (FIG. 1); and communications application software 412 for receiving calls, determining the most efficient or suitable route for the call, and thereafter routing the call. For instance, for an AT&T® subscriber in London trying to make a call using the VODAPHONE® network, the communications server may determine the following routing matrix: for calls that will not incur international roaming (e.g., within U.K.), use authentication information associated with the VODAPHONE® network; and for calls that would incur international roaming (e.g., to New Zealand), determine a routing path, use authentication information associated with networks in the routing path.

Figure 4B:
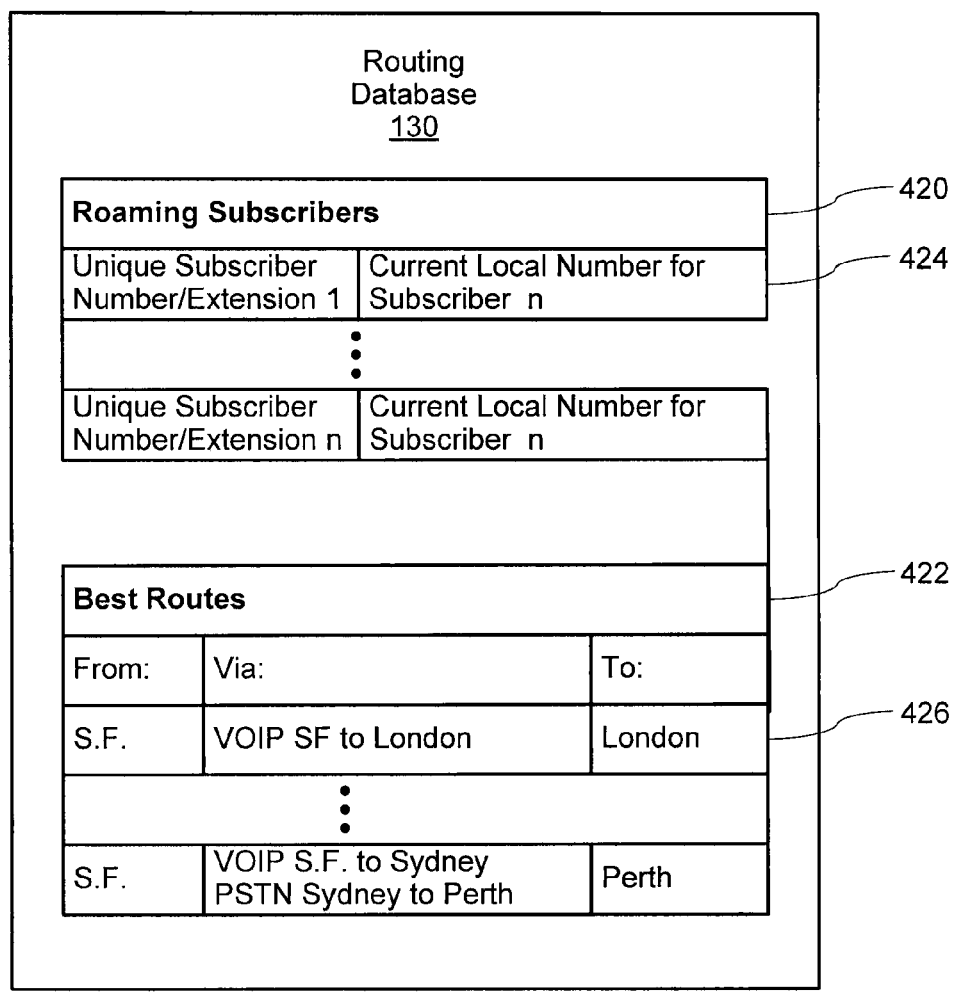
FIG. 4B is a block diagram of an embodiment of the routing database shown in FIG. 1.

FIG. 4B is a block diagram of an embodiment of the routing database 130 shown in FIG. 1. The routing database includes a roaming subscribers database 420 and a best routes database 422. The roaming subscribers database 420 lists the unique phone number or extension of each subscriber, i.e., the unique telephone number assigned to the roaming subscriber and to which all calls to his regular number are forwarded, as well as the corresponding local number currently assigned to the roaming subscriber 424. For example, the AT&T® subscriber having a phone number 415-555-1234 may be assigned current VODAPHONE® number in London of +44-08457-300-123. The best routes database 422 lists the preferred routing details for connections between different geographic locations, such as between San Francisco and London, between San Francisco and Perth, and so on.

Other embodiments for routing calls may be implemented by communications server 128. For instance, communications server 128 that is local to the region from which the call originates may switch the call to a second communications server 128 in the called wireless communication client's home location. Then the second communications server 128 locates the called wireless communication client and, using standard telecommunications technology and protocols, switches the call to the local network 102 for the called wireless communication client's current location. In this way, the calling wireless communication client makes a local outbound call to its local communications server 128, and the called wireless communication client receives an inbound local call over its local network 102.

Figure 5A:
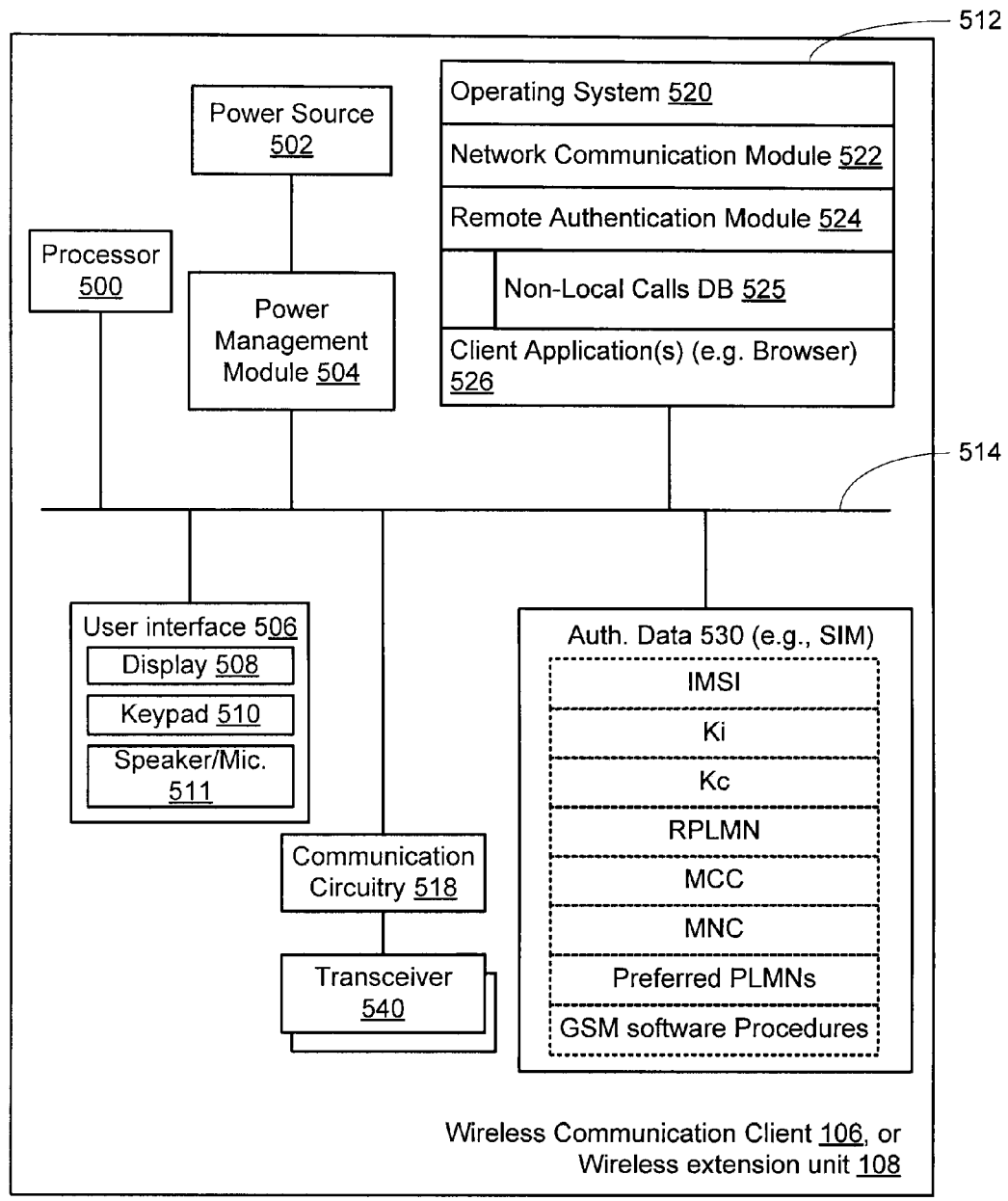
FIG. 5 is a block diagram of an embodiment of the wireless communication client (or wireless communication extension unit) shown in FIG. 1.

FIG. 5A is a block diagram of the wireless communication client 106 (or wireless extension unit 108) shown in FIG. 1. The wireless communication client 106 (or wireless extension unit 108) contains a plurality of components, such as at least one processor 500; a memory 502; communications circuitry 518 coupled to one or more wireless radios or transceivers 540; user interface devices 506, like a display 508, keypad 510, speaker, and microphone 511; a self-contained power source 502 like a battery, coupled to a power management module 504, and at least one bus 514 that connects the aforementioned components. The wireless communication client 106 (or wireless extension unit 108) stores at least a portion of authentication data 530 either on a SIM card and/or in memory 512 as authentication information. Different embodiments may include some or all of these components. Also in some embodiments, these components are at least partially housed within a housing. The processor 500 may be any logic processing unit, such as one or more central processing units (CPUs), digital signal processors (DSPs), application-specific integrated circuits (ASICs), etc.

The communications circuitry 518 is used for communicating with the service provider 110, and/or extension unit 108, and/or data network 114, and/or voice network 112 (FIG. 1). The transceivers 540 may include cellular telephone transceivers as well as BLUETOOTH transceivers or the like, e.g., to communicate with wireless extension unit 108.

The memory 512 may comprise Random Access Memory (RAM), Read Only Memory (ROM), or the like. In some embodiments the wireless communication client 106 (or wireless extension unit 108) includes a hard disk drive (not shown) for reading from and writing to a hard disk, and/or an optical disk drive (not shown) and/or a magnetic disk drive (not shown) for reading from and writing to removable optical disks (not shown) and magnetic disks (not shown), respectively. The optical disk can be read by a CD-ROM, while the magnetic disk can be a magnetic floppy disk or diskette. The hard disk drive, optical disk drive, and magnetic disk drive may communicate with the processing unit via the bus 514. The hard disk drive, optical disk drive and magnetic disk drive may include interfaces or controllers (not shown) coupled between such drives and the bus 514, as is known by those skilled in the relevant art. The drives and their associated computer-readable media, provide non-volatile storage of computer readable instructions, data structures, program modules and other data for the wireless communication client 106 (or wireless extension unit 108). Other types of computer-readable media that can store data accessible by a computer may be employed, such a magnetic cassettes, flash memory cards, digital video disks (DVD), Bernoulli cartridges, RAMs, ROMs, smart cards, etc.

The bus 514 can employ any known bus structures or architectures, including a memory bus with memory controller, a peripheral bus, and a local bus. Unless described otherwise, the construction and operation of the various blocks shown in FIG. 5A are of conventional design. As a result, such blocks need not be described in further detail herein, as they are well understood by those skilled in the relevant art.

The memory 512 may include one or more application programs, modules, and/or data, including an operating system 520 which has instructions for communicating, processing, accessing, storing, or searching data. Examples of suitable operating systems include LINUX, JAVA, WINDOWS MOBILE, PALM OS, or the like. The operating system may also include a basic input/output system (BIOS), which may form part of the ROM, may contain basic routines to help transfer information between elements within the wireless communication client 106 (or wireless extension unit 108), such as during startup. In addition, the memory 512 may also include a network communication module 522 for communicating with the service provider 110, (extension unit 108), (wireless communication client 106), data network 114, and/ or voice network 112 (FIG. 1); a remote authentication module 524 (optionally including a non-local calls database 525, which is discussed further in reference to FIG. 5B), and other client applications 526, such as a Web browser etc. Different embodiments may include some or all of these procedures or modules in memory.

In the case of cellular phones, and in particular GSM cellular phones, the wireless communications device 106 includes one or more SIM card interfaces, such a SIM card slots, electrical contacts such as pins, optical transceivers, or other interfaces. In some embodiments, the SIM card interfaces may be empty, where the wireless communications device 106 relies completely on remote authentication from the instant system, while in other embodiments the SIM interfaces may contain a SIM card 530. The technical details of the SIM card 530 will not be repeated here, as they are well known in the art.

In some embodiments, the wireless extension unit 108 included fewer components, modules, and procedures than listed above. In these embodiments, the wireless extension unit 108 does not include a user interface 506 or client applications 526. In some embodiments that utilize the wireless extension unit 108, the wireless communication client 106 communicates either exclusively voice or data, while the wireless extension unit 108 communicates the other. For example, the wireless communication client 106 may communicate data over the data network 114 (FIG. 1) using the wireless communication client's existing wireless account, such as the AT&T® account, and the wireless extension unit 108 may communicate voice with the service provider 110 (FIG. 1) and voice network 112. In these embodiments, and as described in detail below, wireless communication client 106 communicates voice signals between itself and the extension unit, which communicates the voice communications between itself and the service provider 110 (FIG. 1), such as by using a cellular phone's BLOOTOOTH transceiver.

FIG. 5B is a block diagram of the non-local calls database 525 of FIG. 5A. The non-local calls database 525 lists various locations, corresponding area codes, and corresponding local dial-in telephone numbers for use when the subscriber wants to make a non-local call when present at a particular location. For example, when a user desires to make a non-local call when within a particular location (e.g., a visiting caller in London wants to call his home office in San Francisco), the client 106 or extension unit 108 is able to determine that the called number is not within the local area, and then dial a local communication server 128 (FIG. 1) at a local number from the list. The communication server 128 (FIG. 1), using the routing database 130, then reroutes the call to the destination using the most suitable route. For example, the communications server 128 (FIG. 1) may route the call over Voice Over IP (VOIP) to another communication server near the destination in San Francisco, thereby greatly reducing the cost of the call.

Figure 6:
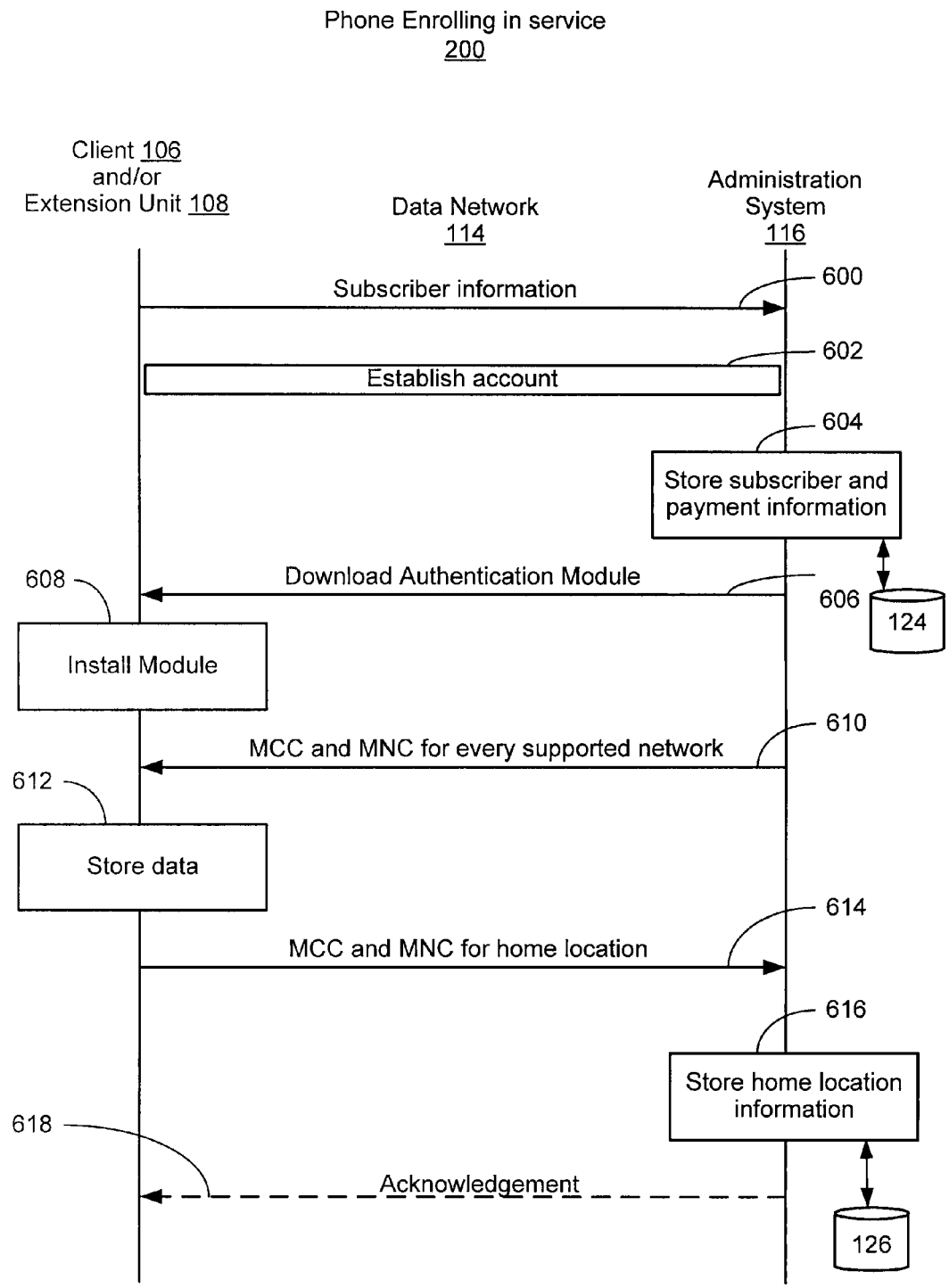
FIG. 6 is an embodiment of a flow diagram of a method of subscribing a user, wireless communication client, or SIM card to the system of FIG. 1.

FIG. 6 is an embodiment of a flow diagram of a method 200 of subscribing a user, wireless communication client 106, wireless communication extension unit 108, and/or SIM card to the system of FIG. 1. Initially, the subscriber, using either the wireless communication client 106, the wireless communication extension unit 108, a combination of the client 106 and the extension unit 108, or a web browser on any computing device, requests a subscription to the administration system 116. The connection to the provisioning server 132 may be via a wireless (for example, 3 G, GPRS, EDGE or WiFi) or wired (for example, Internet or intranet) connection.

The subscriber initiates the request by submitting subscriber information (e.g., name, home location, billing details, phone number, home service provider name, username, and password) to the administration system 116, at 600. A subscriber account is then established at 602. The subscriber account details are then stored by the authentication server 118 in the subscriber database 124 (FIG. 1) at 604. The subscriber then downloads remote authentication module 524 (FIG. 5A) from administration system 116, at 608, and installs it on the wireless communication client 106 and/or wireless extension unit 108 at 608. In some embodiments, the remote authentication module 524 (FIG. 5A) includes: a list of area codes and corresponding locations; a list of local dial-in telephone numbers for use when the subscriber wants to make a non-local call; etc 525 (FIG. 5A). In some embodiments, the remote authentication module 524 (FIG. 5A) on the extension unit 108 is preloaded on the unit at time of manufacture. Also in some embodiments, updates to the remote authentication module 524 (FIG. 5A) are sent automatically to the client 106 or extension unit 108 when needed. In the case where the remote authentication module 524 (FIG. 5) is downloaded via a Web browser onto a separate computing device, such as a subscriber's desktop computer, the subscriber must transfer and install the module onto the wireless communication client 106 and/or wireless extension unit 108 at 608.

Using the network authentication module 552 (FIG. 5A), the wireless communication client 106 transmits its credentials parameters, and its location parameters, such as its MMC and MNC, to the provisioning server 118, at 614. In some embodiments, the wireless communication client 106 determines its location information based on a detection of available cellular networks. The provisioning server 118 may optionally transmit to wireless communication client 106 the IMSI and PLMN, and other information extracted from authentication bank 126 that is capable of being transmitted per subscription based on the location information and availability of those parameters. The provisioning server 118 stores these data, and also the subscriber's personal and payment information in the subscriber database 124 (FIG. 1), at 616, and then optionally sends an acknowledgement to the wireless communication client 106 at 618. In some embodiments, the wireless communication client 106 (or wireless extension unit 108) stores at least a portion of the incoming authentication data either on a SIM card and/or in memory 512 as authentication information.

Figure 7:
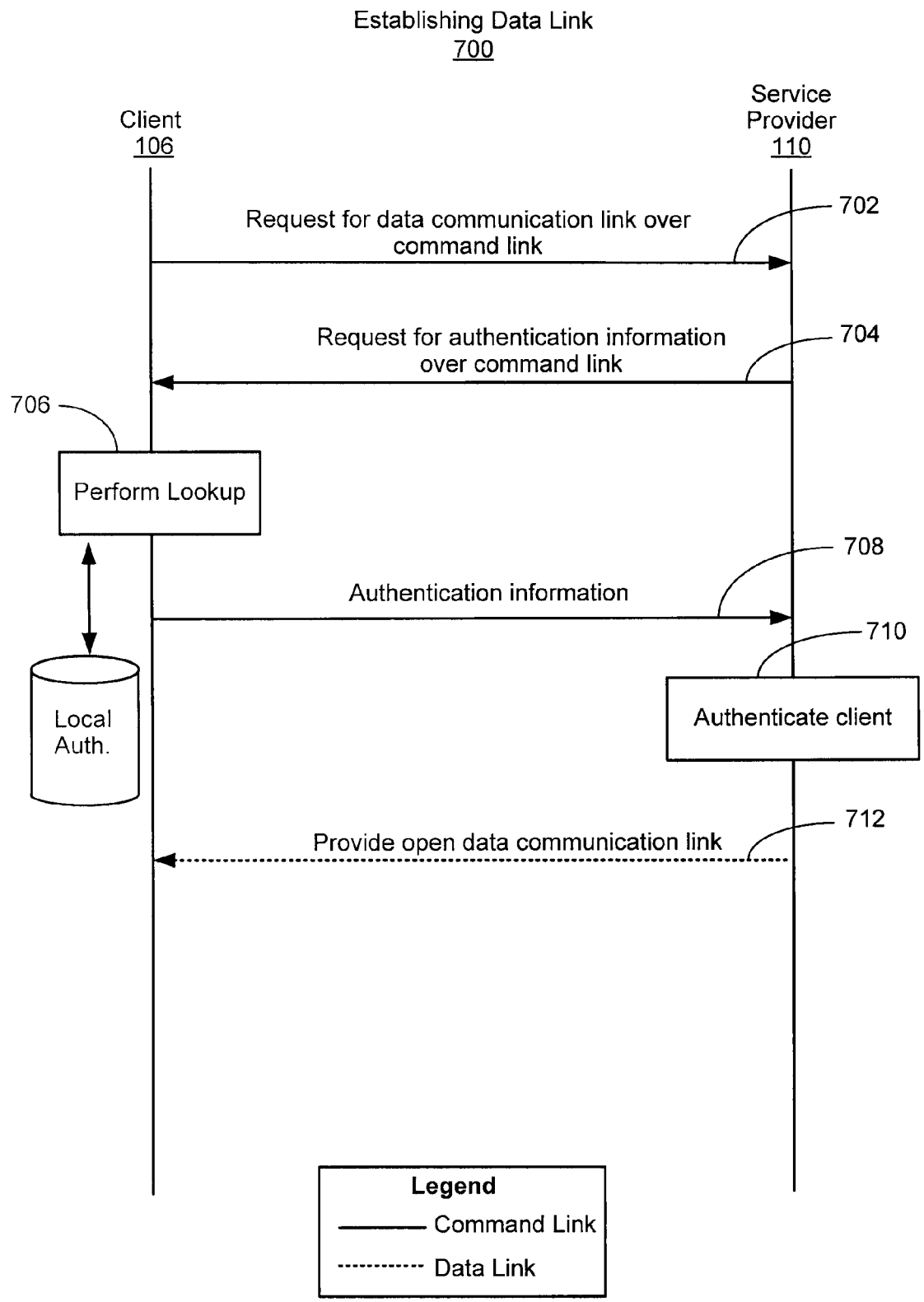
FIG. 7 is an embodiment of a flow diagram of a method establishing a data link for the wireless communication client of FIG. 1.

FIG. 7 is an embodiment of a method 700 for establishing a data link for the wireless communication client 106 shown in FIG. 1. Initially, the wireless communication client 106 requests service over signal link, in this case data service, from the local wireless network carrier at 702. For example, a subscriber with an AT&T® wireless account in San Francisco is traveling to London. The subscriber turns on their cellular telephone, which automatically establishes a network connection if possible, i.e., the subscriber has international roaming privileges, a GSM phone, etc. The request for service may be a request of any of a cellular phone service, a short message service (SMS), a mobile email service, a mobile instant messaging service, an Internet access service, a Voice Over Internet Protocol (VOIP) service, a multimedia message service (MMS), or any combination of the aforementioned.

To establish service, the local service provider 110 requests authentication information from the wireless communication client 106 over signal link at 704. The wireless communication client 106 locates the necessary authentication information from the authentication data 530 (FIG. 5A) at 706. This authentication data may be obtained from a local SIM card or from authentication data 530 stored in memory 512. The authentication data is then sent to the service provider over signal link at 708, which then authenticates the client 106 at 710. Once the client 106 has been authenticated, a local wireless service over data link is provided, including the provision of a data communication link at 712. In some embodiments, the data communication link is established between the wireless communication client 106 and the service provider 110, while in other embodiments, the data communication link is established between the wireless communication extension unit 106 and the service provider 110.

The method described in FIG. 7 is not necessary when provisioning a wireless data communication service like WIFI or WIMAX, where the remote authentication is handled as described with reference to the following figures.

Figure 8:
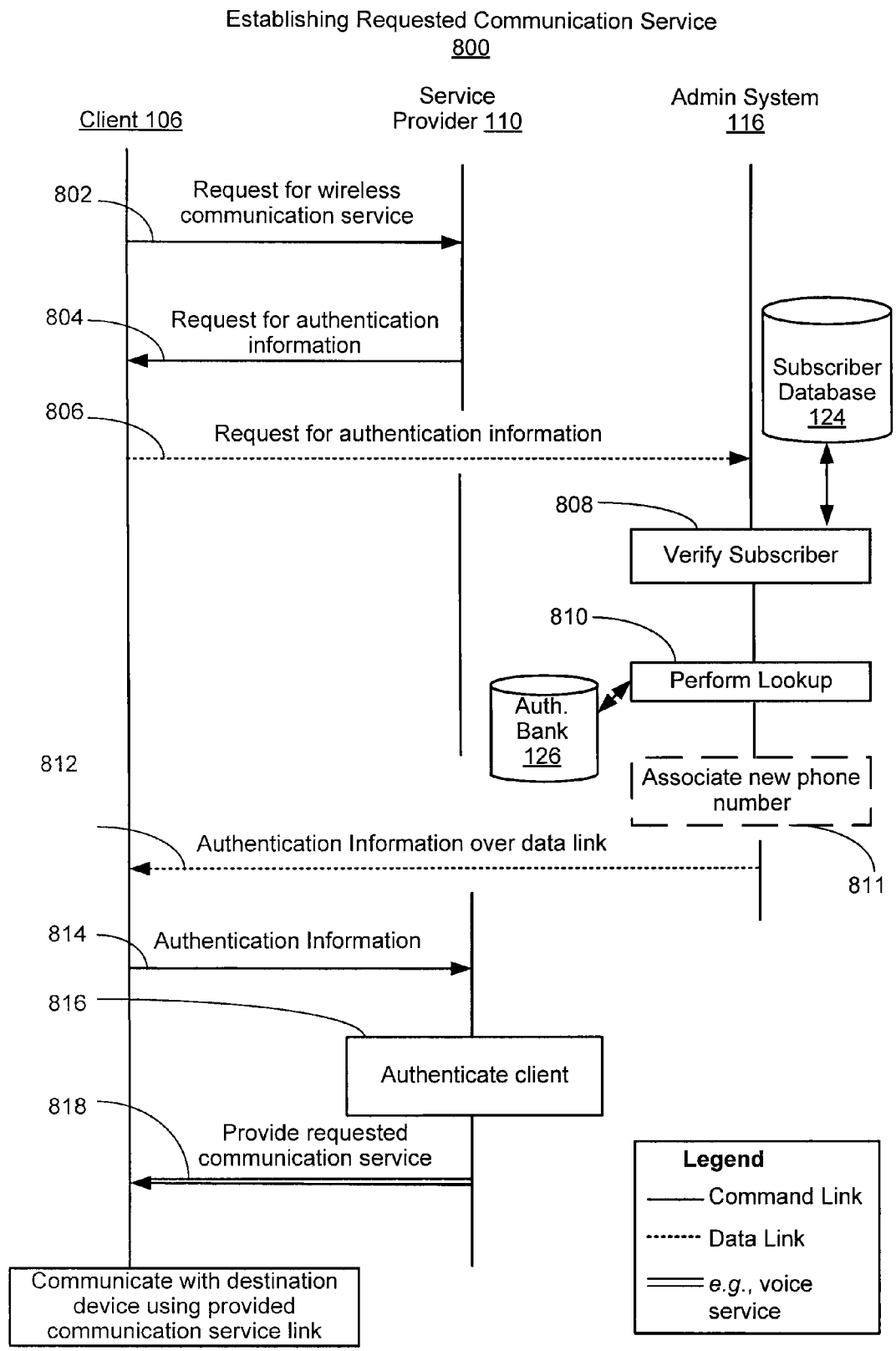
FIG. 8 is an embodiment of a flow diagram of a method of the wireless communication client using the system of FIG. 1.

FIG. 8 is an embodiment of a method 800 of establishing a virtual local wireless service for the wireless communication client 106 (FIG. 1) once a data communications link has been established. In some embodiments, wireless communication client 106 has the capability of accessing a radio for communications services, such as voice, while using a data connection to access remote authentication data to register as a local user. This method 800 is performed without the assistance of the extension unit 108. As soon as the wireless communication client 106 is turned on, or as soon as the wireless communication client 106 attempts to make a call, it requests access to the desired wireless service by sending a request to the local service provider 110 over signal link at 802. For example, a subscriber with an AT&T® account in San Francisco turns on his cellular phone in London. Initially, a data connection is needed, and is established pursuant to FIG. 7. The service provider 110 responds by requesting authentication information from the wireless communication client 106 over signal link at 804. The remote authentication module 524 (FIG. 5A) on the wireless communication client 106 then requests local authentication in Formation from the administration system 116, over the data channel, at 806. The request typically includes the request received from the service provider, a unique subscriber or wireless communication client identifier and/or password, and the wireless communication client's current location. The administration system 116 receives the request for the authentication information and first verifies that the subscriber has an account in good standing, at 808, by searching the subscriber database for the account associated with the particular subscriber of wireless communication client. If the subscriber (or wireless communication client) is verified, the authentication server 118 of the administration system 116 obtains suitable local authentication information from the authentication bank 126, at 810. The management module 216 (FIG. 2A) on the authentication server 118 (FIG. 1) determines local wireless account that is most suitable and available and then obtains the authentication information for that account from the authentication bank 126. For example, if the subscriber is calling during the day in London, the system determines from multiple accounts that a particular VODAPHONE® account is not being used and offers the best rate for the location and time of day, and obtains the authentication information for that VODAPHONE® account from the SIM card associated with that account.

Optionally, at 811, the administration system associates a phone number that is local to the local communications network with the requesting wireless communications system 101. In some embodiments, a phone 324*a* and/or SIM 320*a* and/or authentication information 326 has associated with it a corresponding unique phone number. Accordingly, when phone 324*a* and/or SIM 320*a* and/or authentication information 326 is assigned to a particular wireless communication client 101, the unique phone number is assigned to the wireless communication client 101 as well. In some embodiments, the assignation information is stored in subscriber database 124 and/or routing database 130. For example, an AT&T® subscriber having a phone number 415-555-000 in London is assigned a VODAPHONE® number in London of +44-08457-300-000, so that it appears as a local phone number to VODAPHONE® and does not get charged exorbitant roaming charges.

The authentication information is then sent to the wireless communication client, over the data link, at 812. In some embodiments, optionally, the wireless communication client stores a portion or all of the authentication information, for instance in memory 512, at 813. The wireless communication client receives the authentication information and sends it to the service provider 110 over signal link at 814. The service provider then authenticates the wireless communication client as a local wireless communication client, at 816, and provides the requested service to the wireless communication client at 818. The wireless communication client may then communicate with a destination device using the requested communication link. For example, the AT&T® subscriber can then place any calls using his cellular phone, which acts as a local cellular phone.

Figure 9A:
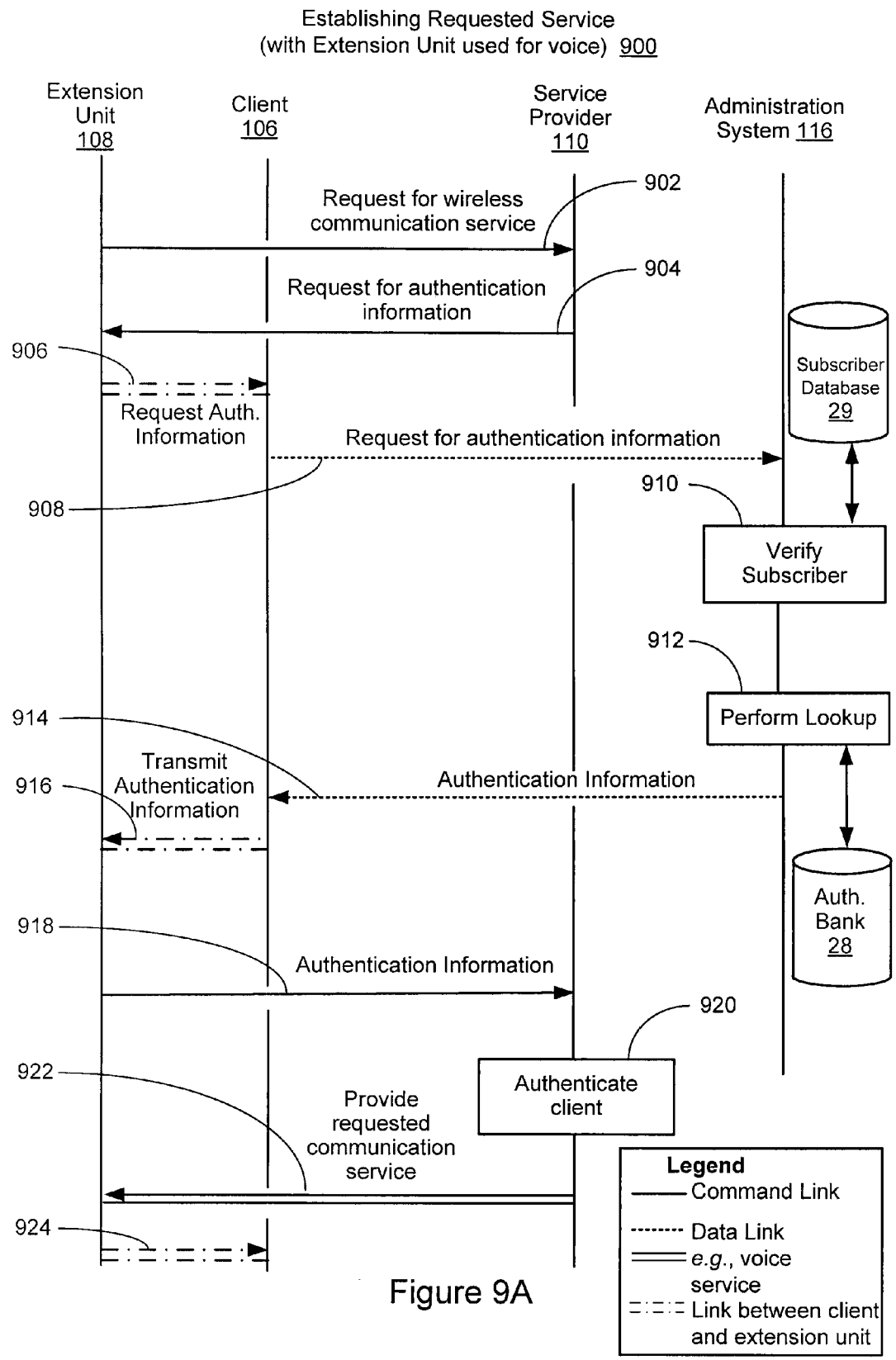
FIG. 9 is an embodiment of a flow diagram of a method of the wireless communication client and wireless communication client extension unit using the system of FIG. 1.
Figure 9B:
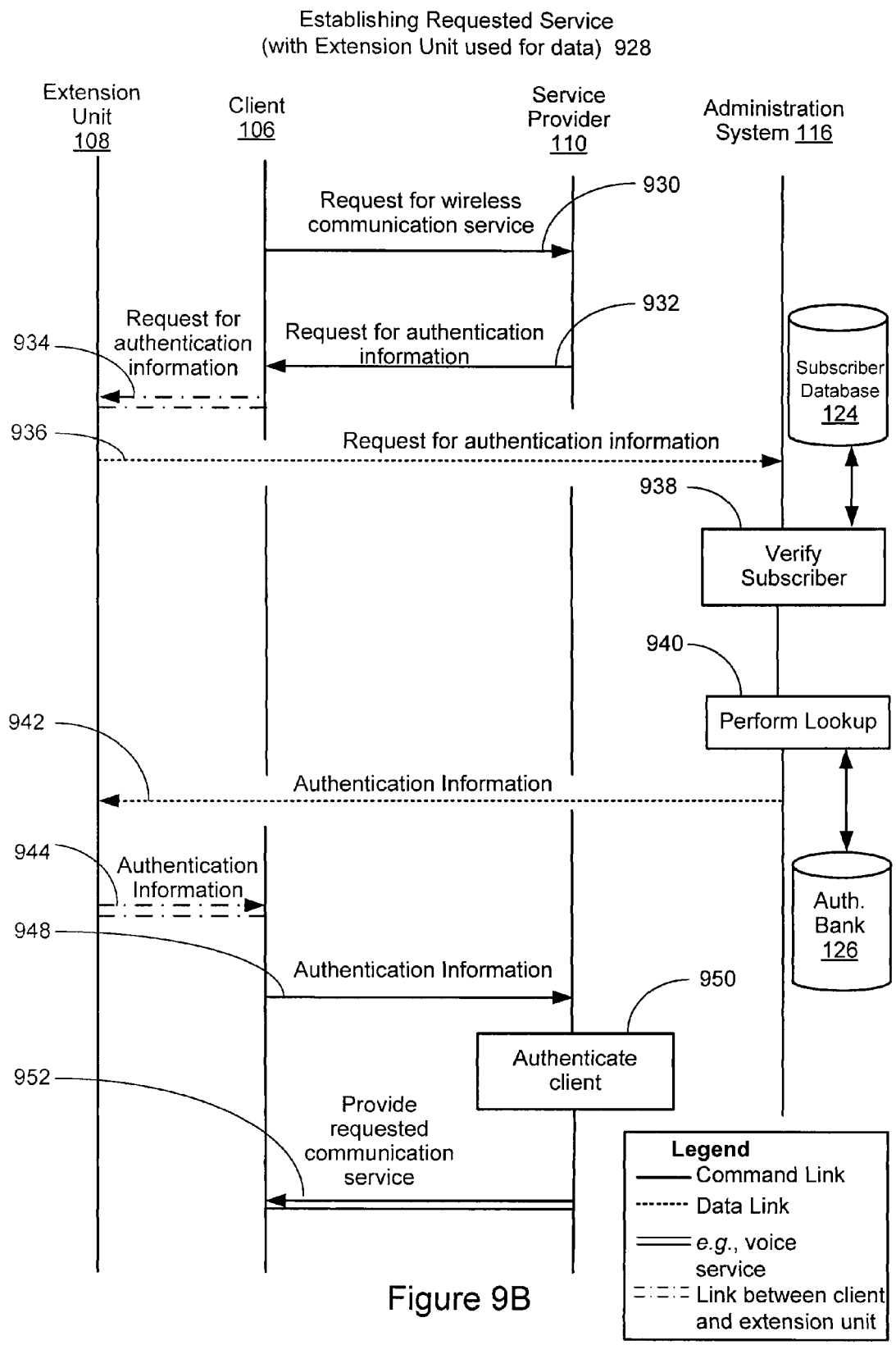

FIGS. 9A and 9B are embodiments of methods 900 and 928 respectively of establishing a virtual local wireless service for the wireless communication client 106 (FIG. 1) using the wireless extension unit 108 (FIG. 1). In some embodiments, wireless communication client 106 does not have the capability of accessing a radio for communications services, such as voice, while using the data connection (established for instance, using the method described in reference to FIG. 7) to access remote authentication data to register as local user. In such a case, wireless communication client 106 and the wireless extension unit 108 may be used together.

In the embodiment illustrated in FIG. 9A, the wireless communication client 106 uses the data connection (established for instance, using the method described in reference to FIG. 7) to access remote authentication data, and the wireless extension unit 108 accessing a radio for providing communications services. With reference to FIG. 9A, as soon as the wireless communication client 106 is turned on, it establishes a data connection as described in relation to FIG. 7. As soon as the wireless extension unit 108 is turned on, or first attempts to make a call, it requests access to the desired local wireless service by sending a request to the local service provider 110 over signal link at 902. For example, a subscriber with an AT&T® account in San Francisco turns on his extension unit and phone in London. Initially, the service provider 110 responds by requesting authentication information over signal link from the wireless communication extension unit 108 at 904. The remote authentication module 524 (FIG. 5A) on the wireless communication extension unit 108 then requests local authentication information from the wireless communication device 106 at 906. Alternatively, the remote authentication module 524 (FIG. 5) on the wireless communication extension unit 108 then requests local authentication information from the administration system 116, over the data channel established between the client 106 and the administration system 116. In some embodiments, communication between the wireless communication extension unit 108 and the service provider 110 occurs via the wireless communication client 106. In some embodiments, communications between the extension unit 108 and the client 106 are via BLUETOOTH wireless connection, while in other embodiments, the communications may occur over a wire coupling the devices.

The request typically includes the request received from the service provider, a unique subscriber or wireless communication extension unit identifier and/or password, and the wireless communication extension unit's current location. The administration system 116 receives the request for the authentication information and verifies that the subscriber has an account in good standing, at 910, by searching the subscriber database for the account associated with the particular subscriber of wireless communication client. If the subscriber (or wireless communication extension unit) is verified, the authentication server 119 of the administration system 116 obtains suitable local authentication information from the authentication bank 126, at 912. In particular, the management module 216 (FIG. 2A) on the authentication server 119 (FIG. 1) determines which local wireless account is most suitable and then obtains the authentication information for that account from the authentication bank 126. For example, if the subscriber is calling during the day in London, the system determines from multiple accounts that a particular VODAPHONE® account is not being used and offers the best rate for London during the day, and obtains the authentication information for that VODAPHONE® account from the SIM card associated with that account.

The authentication information is then sent to the wireless communication client 106, over the data link, at 914. The wireless communication client 106 receives the authentication information and sends it to extension unit 108 at 916. Alternatively, the authentication information is sent directly to the extension unit 108 via the data link established by the wireless communication client 106. Again this authentication information may be sent wirelessly or through a wire coupling the devices. The authentication information is then transmitted to the service provider by the extension unit 108 at 918. The service provider 110 then authenticates the wireless communication extension unit as a local wireless communication client, at 920, and provides the requested service to the wireless communication extension unit at 922. The extension unit 108 then provides a conduit for the requested service to the wireless communication device at 924. The wireless communication client may then communicate with a destination device via the extension unit. For example, the AT&T® subscriber can then place any calls using his cellular phone which are communicated via the extension unit to the destination party, i.e., the subscriber's AT&T® cellular phone acts as a local VODAPHONE® cellular phone.

In the embodiment illustrated in FIG. 9B, the wireless extension unit 108 uses the data connection (established for instance, using the method described in reference to FIG. 7) to access remote authentication data, for instance, on behalf of the wireless communication client 106. FIG. 9B is an embodiment of a method 928 of establishing a local wireless service for the wireless communication client 106 (FIG. 1) using the wireless extension unit 108 (FIG. 1). As soon as the wireless communication client 106 is turned on or attempts to make a call, it requests access to the desired local wireless service by sending a request to the local service provider 110 at 930. For example, a subscriber with an AT&T® account in San Francisco turns on his extension unit and phone in London. The service provider 110 responds by requesting authentication information from the wireless communication client 106 at 932. The remote authentication module 524 (FIG. 5) on the wireless communication client 106 then requests local authentication information from the wireless communication extension unit 108 at 906. In some embodiments, communications between the client 106 and the extension unit 108 are via BLUETOOTH wireless connection, while in other embodiments, the communications may occur over a wire coupling the devices.

At this time or earlier, the extension unit 108 establishes a data connection to the service provider 110 as described above in relation to FIG. 7. The extension unit 108 then requests authentication information from the administration system 116, via the data channel, at 936. The request typically includes the request received from the service provider, a unique subscriber or wireless communication extension unit identifier and/or password, and the wireless communication client's current location. The administration system 116 receives the request for the authentication information and verifies that the subscriber has an account in good standing, at 938, by searching the subscriber database for the account associated with the particular subscriber of wireless communication client. If the subscriber (or wireless communication extension unit) is verified, the authentication server 119 of the administration system 116 obtains suitable local authentication information from the authentication bank 126, at 940. In particular, the management module 216 (FIG. 2A) on the authentication server 119 (FIG. 1) determines which local wireless account is most suitable and then obtains the authentication information for that account from the authentication bank 126. For example, if the subscriber is calling during the day in London, the system determines from multiple accounts that a particular VODAPHONE® account is not being used and offers the best rate for London during the day, and obtains the authentication information for that VODAPHONE® account from the SIM card associated with that account.

The authentication information is then sent to the wireless communication extension unit 108, over the data link, at 942. The extension unit 108 receives the authentication information and sends it to the wireless communication client 106 at 944. Again this authentication information may be sent wirelessly or through a wire coupling the devices. The authentication information is then transmitted to the service provider by the client 106 at 948. The service provider 110 then authenticates the wireless communication client 106 as a local wireless communication client, at 950, and provides the requested service to the wireless communication client 106 at 952. The wireless communication client 106 may then communicate with a destination device. For example, the AT&T® subscriber can then place any calls using his cellular phone to the destination party, i.e., the subscriber's AT&T® cellular phone acts as a local VODAPHONE® cellular phone.

Figure 10:
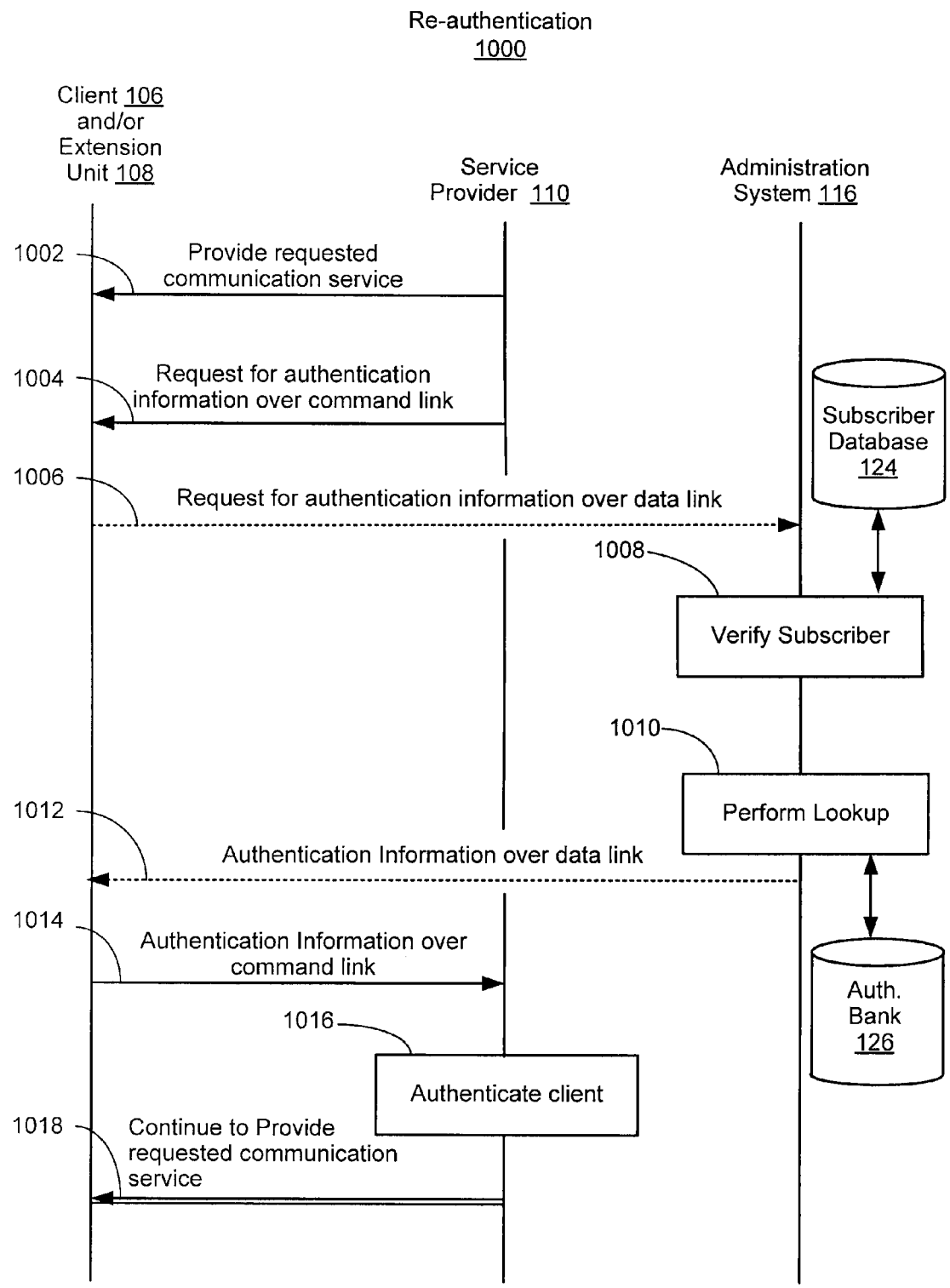
FIG. 10 is an embodiment of a flow diagram of a method of a wireless communication client re-authenticating with the service provider of FIG. 1.

FIG. 10 is an embodiment of a flow diagram of a method 1000 re-authenticating with the service provider 110 of FIG. 1. Every so often, the wireless communication client 106 and/or extension unit 108 may need to re-authenticate with the service provider 110. This is generally required by the service provider 110 to thwart security breaches. Once the service provider has provided the requested service, at 1002, as described above, the service provider 110 may periodically, or at any time, request re-authentication at 1004. Depending on the embodiment, the client 106 or extension unit 108 then requests re-authentication from the administration server 116 over the data link at 1006. As before, the administration system 116 receives the request for the authentication information and verifies that the subscriber has an account in good standing, at 1008, by searching the subscriber database for the account associated with the particular subscriber of wireless communication client. If the subscriber (or wireless communication extension unit) is verified, the authentication server 119 of the administration system 116 obtains suitable local authentication information from the authentication bank 126, at 1010. In particular, the management module 216 (FIG. 2A) on the authentication server 119 (FIG. 1) determines which local wireless account is most suitable and then obtains the authentication information for that account from the authentication bank 126.

The authentication information is then sent to the wireless communication client 106 or extension unit 108, over the data link, at 1012. The client 106 or extension unit 108 receives the authentication information and it or the other of the client 106 or extension unit 108 sends it to the service provider at 1014. Again this authentication information may be sent wirelessly or through a wire coupling the devices. The service provider 110 then authenticates the wireless communication client 106 as a local wireless communication client, at 1016, and continues to provide the requested service to the wireless communication client 106 or extension unit 108 at 1018. The wireless communication client 106 may then continue to communicate with a destination device. For example, the AT&T® subscriber can then place any calls using his cellular phone to the destination party, i.e., the subscriber's AT&T® cellular phone acts as a local VODAPHONE® cellular phone.

Once a cellular telephone subscriber is operating his or her foreign cellular phone in a local cellular phone communication network as if it were a local cellular phone, the user can easily make outgoing local calls at a local rate that is significantly lower than the roaming rate. In other words, when making local outbound calls, or receiving local inbound calls (described below), there is no distinction between the foreign wireless communication client and any other local wireless communication client. However, if the user desires to call a non-local number, e.g., if a subscriber from San Francisco visiting London wants to call a now long-distance number in San Francisco, the non-local call is routed to a local communication server and then routed to an appropriate communication server which serves San Francisco area with economical rate, to reach the destination. See the description of FIG. 5B.

For incoming calls, the user manually, or via the service described herein (manually or automatically), temporarily has all calls forwarded to a unique local telephone number (or telephone number and unique extension code) at a communication server 128 (FIG. 1) closest to the subscriber's home location. The routing database 130 at this communication server 128 (FIG. 1) constantly associates the unique local telephone number assigned to the subscriber with the current local telephone number assigned to the subscriber. For example, if the user is currently in London, and has a particular VODAPHONE® account and telephone number assigned to him, the routing number associates the unique local telephone number with the subscriber's current VODAPHONE® local number. Then, when a call is made to the subscriber's regular number, it is forwarded to nearest communication server, and then routed to the current local number associated with the subscriber (e.g., VODAPHONE® number) where the user receives the call. Incoming calls are routed as is most efficient or suitable for the subscriber and service operator. For example, the incoming call may be routed from the communication server nearest the subscriber's home location to another communication server nearest the subscriber's current local location over VOIP. This greatly reduces the cost of incoming calls, and the entire process is transparent to the subscriber and the party calling the subscriber.

It should be appreciated that the system described in FIG. 1 and the methods described in FIG. 6-10 can be used for providing any other type of wireless voice or data service, such as WIMAX, WFI, VOIP, etc. For instance, in the case of wireless data services, like WIFI or WIMAX, users connect to remote wireless access points or "hotspots" by first connecting through a data channel on their cellular telephone to the administration server; obtaining authentication information (such as a username and password) for the WIMAX or WIFI network; and then using this authentication information for accessing the WIFI or WMAX network on their cellular phone, laptop, etc.

Alternative Embodiments

Some wireless communication clients do not allow modification of the authentication data (for example, Ki) and software procedures stored in the SIM 530, other than through normal GSM communications with the network 102. As a result, in embodiments in which such data is downloaded to wireless communication client 101 from administration system 116 cannot be implemented completely. To overcome this limitation, one alternative embodiment downloads application software and authentication data (such as, IMSI, Kc and other parameters capable of being transmitted and stored on the client) to the memory of the wireless communications system, such that during operations the authentication data is communicated to the network 102 in place of the SIM-stored data. Accordingly, during enrollment (FIG. 6), the provisioning server 132 transmits to the subscriber, application software that supports this embodiment. The subscriber installs that software in its memory. During registration (FIG. 6), the provisioning server 132 downloads key authentication parameters, such as IMSI, to the subscriber. The subscriber then stores the transmitted data in memory.

When establishing the data link (FIG. 7), the service provider 110 requests authentication information from the wireless communication client 106 (or wireless extension unit 108), at 704. The service provider 110 reads the authentication data received from the authentication server 118 and stored in the memory of the wireless communication client 106 (or wireless extension unit 108) and does not read authentication data stored in the local SIM. Additionally, during other operations that require authentication information, the application software 524 intervenes and causes the wireless communication client 106 (or wireless extension unit 108) to transmit or use the authentication information received from the provisioning server 132 instead of the SIM-stored data.

Alternatively or in addition, in some embodiments, authentication data received from the authentication server 118 may not be stored at the wireless communications system 101. This may be due to the nature of authentication data (e.g., authentication data may change dynamically), and/or due to some quality of the wireless communications system 101 (e.g., wireless communications system 101 has limited and/or insecure memory). In these cases, whenever authentication or re-authentication by service provider 110 is required, the wireless communications system 101 follows re-authentication procedure 1000 (FIG. 10). Accordingly, the wireless communications system 101 requests authentication data from administration system 116 whenever authentication or re-authentication by service provider 110 is required.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the described embodiments can utilize different registration, power-up, call-out or call-in procedures than those described here. The embodiments were chosen and described in order to best explain the principles of the invention and its practical applications, to thereby enable others skilled in the art to best utilize the invention and various embodiments with various modifications as are suited to the particular use contemplated.

Furthermore, the figures herein are intended more as functional description of the various features which may be present in a set of servers than as a structural schematic of the embodiments described herein. In practice, and as recognized by those of ordinary skill in the art, items shown separately could be combined and some items could be separated. For example, some items shown separately in the Figures could be implemented on single servers and single items could be implemented by one or more servers. The actual number of servers and how features are allocated among them will vary from one implementation to another, and may depend in part on the amount of data traffic that the system must handle during peak usage periods as well as during average usage periods.

What is claimed is:

1. A method of operating a foreign wireless communication device in a local communication network as a virtual local communication device, said method comprising:

enabling an initial setting of said foreign wireless communication device for enrolling said foreign wireless communication device in service, wherein said initial setting is based on communications between said foreign wireless communication device and a remote administration system, said foreign wireless communication device comprises a foreign wireless client and an extension unit which are coupled with each other, said extension unit wirelessly communicating directly with said foreign wireless client, said local communication network and said remote administration system, and said remote administration system further comprises at least one authentication server, at least one provisioning server, at least one communication server, at least one subscriber database, at least one routing database, and at least one authentication bank having a plurality of subscriber identity modules (SIMs), phones and authentication data, and wherein said at least one authentication server and said at least one provision server are coupled to a data network;

establishing a data communication link to transmit information among said foreign wireless communication device, a service provider in said local communication network, and said remote administration system upon said enabling said initial setting, wherein said service provider comprises a plurality of mobile telephone switching centers and base cellular centers, and said service provider further is coupled to said data network and a phone network;

establishing a local authentication information which includes a local number and an International Mobile Subscriber Identity (IMSI) in response to a local authentication request by said service provider to said foreign wireless client upon said established data communication link, wherein said extension unit wirelessly relays said local authentication information request to said at least one authentication server and obtains a suitable local authentication information from said at least one authentication bank coupled to said at least one said authentication server;

establishing a virtual local wireless service provided by said service provider to said foreign wireless client according to said obtained suitable local authentication information, wherein said virtual local wireless service is wirelessly requested by said extension unit through said remote administration system; and providing a communication service to said foreign wireless communication device according to said established virtual wireless service, wherein said foreign wireless client becomes said virtual local wireless communication device acting as a local cellular phone with an assigned local phone number over a voice link via said phone network and/or said data link via said data network through said at least one communication server, and said at least one communication server is coupled to said data network, said phone network and said at least one routing database having lists of preferred routing details for connections between different geographic locations, and said assigned local phone number is based on said obtained suitable local authentication information.

2. The method of claim 1, wherein the enabling an initial setting step further comprising:
   requesting a subscription to said remote administration system from said foreign wireless client, said extension unit, or a combination of said foreign wireless client and said extension unit;
   establishing account details of said foreign wireless client and/or said extension unit, wherein said account details are then stored in said at least one subscriber database by said at least one authentication server;
   downloading and installing a remote authentication module from said remote administration system to said foreign wireless client and/or said extension unit;
   transmitting credential parameters and location parameters of said foreign wireless client and/or said extension unit to said at least one provision server, wherein said credential parameters and said location parameters are then stored in said at least one provision server; and
   sending an acknowledgement to said foreign wireless client and/or said extension unit upon said credential parameters and said location parameters are stored in said at least one provision server.

3. The method of claim 1, wherein the establishing a data link step further comprising:
   sending a request for said data link from said foreign wireless client and/or said extension unit to said service provider over a command link;
   requesting an authentication information stored in said foreign wireless client and/or said extension unit from said service provider to said foreign wireless client and/or said extension unit over said command link;
   locating said authentication information stored in, said foreign wireless client and/or said extension unit;
   sending the located authentication information to said service provider over said command link;
   receiving the located authentication information from said foreign wireless client and/or said extension unit at said service provider;
   authenticating said foreign wireless client and/or said extension unit according to the received authentication information by said service provider; and
   providing said data link, which is different to said command link, upon said authenticated said foreign wireless client and/or said extension unit.

4. The method of claim 1, wherein the establishing a local authentication information step further comprising:
   sending a request for the communication service from said extension unit to said service provider over a command link;
   responding by requesting authentication information from said service provider to said extension over said command link;
   requesting said local authentication information by said extension unit from said remote administration system over said established data link ;
   looking for suitable local authentication information from said at least one authentication bank in response to the requested local authentication information; and
   sending said suitable local authentication information found from said at least one authentication bank to said extension unit from said remote administration system over said established data link.

5. The method of claim 4, wherein responding by requesting an authentication information step further comprising:
   responding by requesting said authentication information from said service provider to said foreign wireless client; and
   transmitting said responding from said foreign wireless client to said extension unit.

6. The method of claim 4, wherein the requesting said local authentication information step further comprising:
   requesting said local authentication information by said extension unit to said foreign wireless client; and
   transmitting said requesting from said foreign wireless client to said remote administration system.

7. The method of claim 4, wherein sending said suitable local authentication information step further comprising:
   sending said suitable local authentication information found from said at least one authentication bank to said foreign wireless client from said remote administration system over said established data link; and
   transmitting said suitable local authentication information from said foreign wireless client to said extension unit.

8. The method of claim 1, wherein the establishing a virtual local wireless service step further comprising:
   sending said obtained suitable local authentication information by said extension unit to said service provider; and
   authenticating said extension unit as said virtual local wireless communication device.

9. The method of claim 8, wherein the providing a communication step further comprising:
   providing a communication service to said extension unit according to said authenticating said extension unit as said virtual local wireless communication device;
   providing a conduit for said communication service by said extension unit to said foreign wireless client; and
   communicating with a destination device by said foreign wireless client via said extension unit.

10. The method of claim 1, wherein the establishing a virtual local wireless service step further comprising:
    sending said obtained suitable local authentication information by said extension unit to said foreign wireless client;
    transmitting said obtained suitable local authentication information from said foreign wireless client to said service provider; and
    authenticating said foreign wireless client as said virtual local wireless communication device.

11. The method of claim 10, wherein the providing a communication step further comprising:
    providing a communication service to said foreign wireless client according to said authenticating said foreign wireless client as said virtual local wireless communication device; and
    communicating with a destination device by said foreign wireless client.

12. The method of claim 1, wherein said foreign wireless client and said extension unit are configured to one device.

13. The method of claim 1, wherein said foreign wireless client and said extension unit are configured to two individual devices.

14. The method of claim 1, the method further comprising requesting a re-authentication by said service provider to said foreign wireless communication device.

15. The method of claim 14, wherein requesting a re-authentication step further comprising:
- providing a request for the communication service by said service provider to said foreign wireless client and/or said extension unit over a command link;
- requesting authentication information from said service provider to said foreign wireless client and/or said extension unit over said command link periodically;
- requesting local re-authentication information by said foreign wireless client and/or said extension unit from said remote administration system over said data link;
- looking for suitable local re-authentication information stored in said remote administration system by said remote administration system;
- sending said suitable local re-authentication information to said foreign wireless client and/or said extension unit from said remote administration system over said data link;
- receiving said suitable local re-authentication information by said foreign wireless client and/or said extension unit;
- sending said suitable local re-authentication information from said foreign wireless client and/or said extension unit to said service provider;
- authenticating said foreign wireless client and/or said extension unit as said virtual local wireless communication device; and
- continuing to provide said communication service to said foreign, wireless client and/or said extension unit.

16. The method of claim 1, wherein said local authentication information is stored in one of SIM cards, universal subscriber identity module (USIM) cards, removable identity module (RUIM) cards, Willcom-SIM cards.

* * * * *